United States Patent
Sakino

(10) Patent No.: US 9,774,794 B2
(45) Date of Patent: Sep. 26, 2017

(54) RADIOGRAPHIC IMAGE CAPTURING APPARATUS AND RADIOGRAPHIC IMAGE CAPTURING SYSTEM

(71) Applicant: Konica Minolta, Inc., Tokyo (JP)

(72) Inventor: Kazuhiro Sakino, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 125 days.

(21) Appl. No.: 14/193,609

(22) Filed: Feb. 28, 2014

(65) Prior Publication Data
US 2014/0239189 A1 Aug. 28, 2014

(30) Foreign Application Priority Data

Feb. 28, 2013 (JP) .................................. 2013-038073

(51) Int. Cl.
| | |
|---|---|
| H04N 5/32 | (2006.01) |
| H04N 5/361 | (2011.01) |
| G01T 1/24 | (2006.01) |
| H04N 5/378 | (2011.01) |

(52) U.S. Cl.
CPC .............. *H04N 5/32* (2013.01); *G01T 1/247* (2013.01); *H04N 5/361* (2013.01); *H04N 5/378* (2013.01)

(58) Field of Classification Search
CPC ............................... H04N 5/361; H04N 5/378
See application file for complete search history.

(56) References Cited

U.S. PATENT DOCUMENTS

| | | | | |
|---|---|---|---|---|
| 2003/0086523 A1* | 5/2003 | Tashiro | .................... | A61B 6/00 378/19 |
| 2004/0256567 A1* | 12/2004 | Nokita | .............. | H01L 27/14632 250/370.08 |
| 2009/0001276 A1* | 1/2009 | Yagi | ........................ | A61B 6/032 250/370.09 |
| 2010/0019176 A1* | 1/2010 | Tanabe | ................. | A61B 6/4233 250/591 |
| 2011/0305321 A1* | 12/2011 | Iwakiri | ................... | A61B 6/486 378/98.8 |

(Continued)

FOREIGN PATENT DOCUMENTS

| | | |
|---|---|---|
| JP | 06342099 A | 12/1994 |
| JP | 09073144 A | 3/1997 |

(Continued)

*Primary Examiner* — David Porta
*Assistant Examiner* — Jeremy S Valentiner
(74) *Attorney, Agent, or Firm* — Cantor Colburn LLP

(57) ABSTRACT

A radiographic image capturing apparatus and a radiographic image capturing system are shown. According to one aspect, the radiographic image capturing apparatus includes the following. A scanning driving unit applies voltage to scanning lines. A switching element releases electric charge upon application of the ON-state voltage. A readout circuit converts the electric charge into image data and reads the data. A controller reads the image data. The detecting unit detects start and end of irradiation based on a change in a signal. The controller determines whether a standby time from end of readout to start of readout in next capturing is changed with reference to a first period and a second period. The first period ranges from end of readout to detection of start of irradiation. The second period ranges from detection of end of irradiation to start of readout.

8 Claims, 16 Drawing Sheets

(56) References Cited

U.S. PATENT DOCUMENTS

| | | | | |
|---|---|---|---|---|
| 2011/0317809 A1* | 12/2011 | Eguchi | ............... | A61B 6/4233 378/62 |
| 2012/0132810 A1* | 5/2012 | Uchiyama | ............... | H04N 5/32 250/358.1 |
| 2012/0132825 A1* | 5/2012 | Amitani | ............... | A61B 6/00 250/394 |
| 2012/0217410 A1* | 8/2012 | Amitani | ............... | H04N 5/367 250/370.09 |
| 2012/0229666 A1* | 9/2012 | Hagihara | ............... | H04N 5/378 348/222.1 |
| 2013/0032696 A1* | 2/2013 | Tajima | ............... | A61B 6/42 250/208.1 |
| 2013/0136233 A1* | 5/2013 | Okada | ............... | G01T 1/247 378/62 |

FOREIGN PATENT DOCUMENTS

| | | | |
|---|---|---|---|
| JP | 2002301053 | A | 10/2002 |
| JP | 2006058124 | A | 3/2006 |
| JP | 2009219538 | | 10/2009 |
| WO | 2011135917 | A1 | 3/2011 |

\* cited by examiner

RADIOGRAPHIC IMAGE CAPTURING APPARATUS AND RADIOGRAPHIC IMAGE CAPTURING SYSTEM

CROSS REFERENCE TO RELATED APPLICATIONS

The present invention claims priority under 35 U.S.C. §119 to Japanese Application No. 2013-038073, filed Feb. 28, 2013, the entire content of which is incorporated herein by reference.

BACKGROUND

Field of the Invention

The present invention relates to a radiographic image capturing apparatus and a radiographic image capturing system, particularly to a radiographic image capturing apparatus that can capture serial images, such as moving images, of a subject and a radiographic image capturing system including the radiographic image capturing apparatus.

Description of Related Art

Radiographic image capturing apparatuses using flat panel detectors (FPDs) are well known. Traditional radiographic image capturing apparatuses have integrated supports and are used for particular purposes. In recent years, portable radiographic image capturing apparatuses including radiation detectors in housing so as to be portable have been developed and used in practice.

With such a radiographic image capturing apparatus, a series of radiographic image capturing including the successive irradiation of a subject with radiation are conducted for producing moving images or other images in some cases. The series of radiographic image capturing involves a sequence of readouts of the resulting image data D to capture radiographic images of frames for moving images or other images. In particular, the process alternates between the irradiation of a subject with radiation from a radiation source 52 of a radiation generator 55 (see FIG. 4, for example) to a radiographic image capturing apparatus, and the readout of the image data D from radiation detectors 7. Thus, the image data D are generated through a series of radiographic image capturing. A radiographic image is generated from the image data D produced by each radiographic image capturing, resulting in the generation of moving images or other images.

For instance, if the radiation generator 55 and the radiographic image capturing apparatus are made by the same manufacturer, an interface can be established between them. For instance, a signal is transmitted to the radiation generator 55 when the radiographic image capturing apparatus becomes ready to be irradiated with radiation, and the radiation generator 55 emits radiation upon the reception of the signal, so that the process properly alternates between the irradiation with radiation from the radiation generator 55 and the readout of the image data D by the radiographic image capturing apparatus to capture moving images or other images.

If the manufacturers of the radiation generator 55 and the radiographic image capturing apparatus are different, the establishment of an interface therebetween is not always readily achievable or may be unachievable. In such a case, the radiographic image capturing apparatus cannot sense the timing of the emission of radiation from the radiation generator 55. Such a trouble in coordination between the radiation generator 55 and the radiographic image capturing apparatus may cause an overlap between the timing of the readout of the image data D in the radiographic image capturing apparatus and the timing of the irradiation with radiation from the radiation generator 55.

For instance, if the radiation generator 55 starts the next irradiation of radiation while the radiographic image capturing apparatus reads out the image data D based on the electric charge generated by the preceding irradiation of radiation in each radiation detector 7, the image data D generated by the preceding radiographic image capturing is not accurately read from each radiation detector 7 due to the electric charge generated by the following irradiation of radiation in each radiation detector 7. Similarly, if the readout of the image data D starts too early, and the readout of the image data D starts during the irradiation, the image data D cannot be correctly readout.

Accordingly, a minimum requirement for radiographic capturing for moving images or other images without establishment of an interface between the radiation generator 55 and the radiographic image capturing apparatus is to avoid an overlap between the timing of the readout of the image data D in the radiographic image capturing apparatus and the timing of the irradiation with radiation from the radiation generator 55 to capture moving images or other images.

SUMMARY

An object of the present invention, which has been made to solve such problems, is to provide a radiographic image capturing apparatus and a radiographic image capturing system including a radiographic image capturing apparatus which can detect the irradiation of radiation so that an overlap is avoided between the timing of the readout of image data in the radiographic image capturing apparatus and the timing of the irradiation with radiation from the radiation generator to capture serial radiographic images, such as moving images, of a subject.

In order to achieve at least one of the above-described objects, according to an aspect of the present invention, there is provided a radiographic image capturing apparatus and a radiographic image capturing system including:

a plurality of scanning lines and a plurality of signal lines;

a plurality of two-dimensionally arrayed radiation detectors;

a scanning driving unit which applies an ON-state voltage or an OFF-state voltage by switching to each scanning line;

a switching element connected to each scanning line, the switching element releasing electric charge from the radiation detector into the signal line upon application of the ON-state voltage;

a readout circuit which converts the electric charge released from the radiation detector into image data and reads the image data;

a controller which controls at least the scanning driving unit and the readout circuit to read the image data; and a detecting unit which detects start and end of irradiation with radiation based on a change in a signal according to the irradiation with radiation, wherein in a series of radiographic image capturing, the controller determines whether a standby time from end of readout of the image data to start of readout of the image data in next radiographic image capturing is changed with reference to a first period and a second period, the first period ranging from end of readout of the image data to detection of start of irradiation with radiation by the detecting unit, the second period ranging from detection of end of irradiation with radiation by the detecting unit to start of readout of the image data.

According to another aspect of the present invention, there is provided a radiographic image capturing apparatus and a radiographic image capturing system including:

a plurality of scanning lines and a plurality of signal lines;

a plurality of two-dimensionally arranged radiation detectors;

a scanning driving unit which applies an ON-state voltage or an OFF-state voltage by switching to each scanning line;

a switching element connected to each scanning line, the switching element releasing electric charge from the radiation detector into the signal line upon application of the ON-state voltage;

a readout circuit which converts the electric charge released from the radiation detector into image data and reads the image data;

a controller which controls at least the scanning driving unit and the readout circuit to read the image data; and a detecting unit which detects end of irradiation with radiation based on a change in a signal according to the irradiation with radiation, wherein, in a series of radiographic image capturing, the controller determines whether a standby time from end of readout of the image data to start of readout of the image data in next capturing is changed with reference to a period from detection of end of irradiation with radiation by the detecting unit to start of readout of the image data.

According to another aspect of the present invention, there is provided a radiographic image capturing apparatus and a radiographic image capturing system including:

a plurality of scanning lines and a plurality of signal lines;

a plurality of two-dimensionally arrayed radiation detectors;

a scanning driving unit which applies an ON-state voltage or an OFF-state voltage by switching to each scanning line;

a switching element connected to each scanning line, the switching element releasing electric charge from the radiation detector into the signal line upon application of the ON-state voltage;

a readout circuit which converts the electric charge released from the radiation detector into image data and reads the image data;

a controller which controls at least the scanning driving unit and the readout circuit to read the image data; and a detecting unit which detects start of irradiation with radiation based on a change in a signal according to the irradiation with radiation, wherein, in a series of radiographic image capturing, the controller determines whether a standby time from end of readout of the image data to start of readout of the image data in next capturing is changed with reference to a period from end of readout of the image data to detection of start of irradiation with radiation by the detecting unit.

BRIEF DESCRIPTION OF THE DRAWINGS

The present invention will become more fully understood from the detailed description given hereinbelow and the appended drawings, and thus are not intended to define the limits of the present invention, and wherein.

DETAILED DESCRIPTION OF PREFERRED EMBODIMENTS

Embodiments of the radiographic image capturing apparatus and the radiographic image capturing system according to the present invention will now be described with reference to the attached drawings. In the following description, the radiographic image capturing apparatus is an "indirect radiographic image capturing apparatus" which includes a scintillator and accompanying components and converts emitted radiation into light having a different wavelength, such as visible light, to obtain electrical signals. Alternatively, a "direct radiographic image capturing apparatus", which directly detects radiation with a radiation detector without a scintillator and accompanying components, may be used in the present invention. In the following description, the radiographic image capturing apparatus is portable.

Alternatively, a radiographic image capturing apparatus which has an integrated support and is used for an exclusive purpose may be used in the present invention.

[First Embodiment]

[Structure and Other Details of Radiographic Image Capturing Apparatus]

Figure 1:
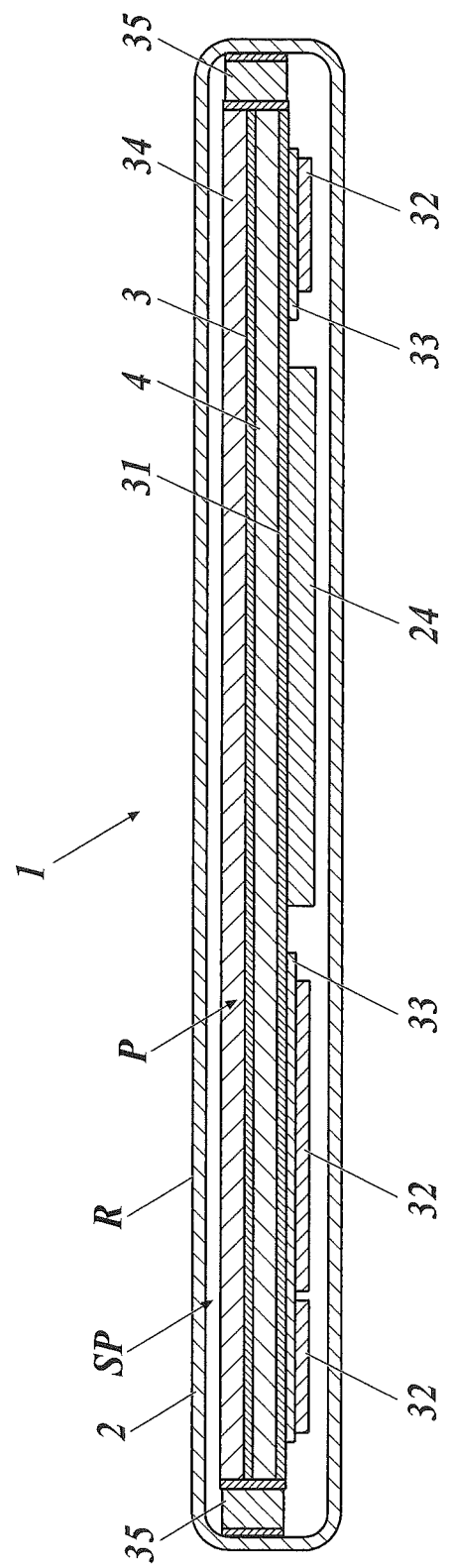
FIG. 1 is a cross-sectional view of a radiographic image capturing apparatus.
Figure 2:
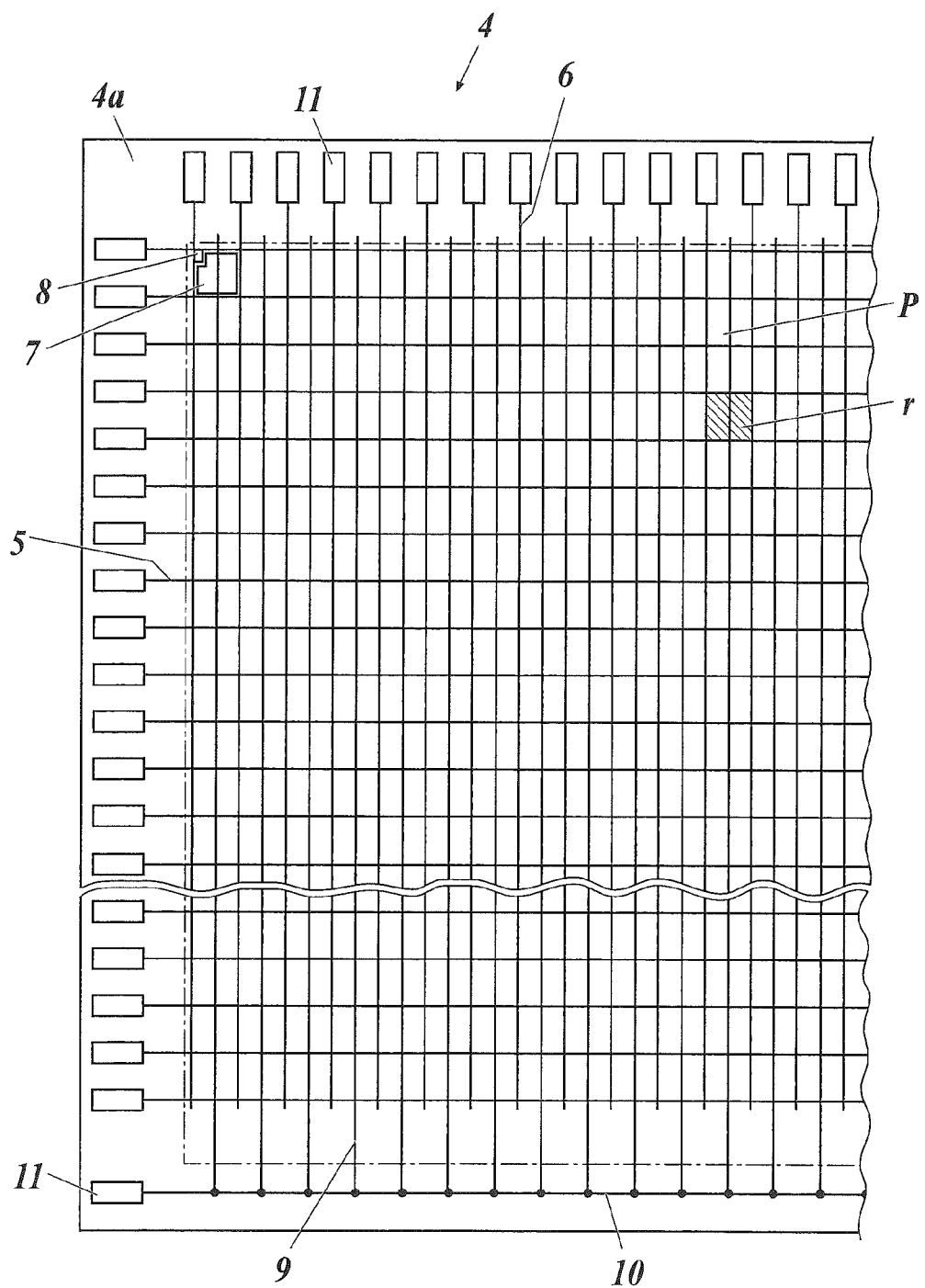
FIG. 2 is a plan view illustrating the structure of a substrate of the radiographic image capturing apparatus.
Figure 4:
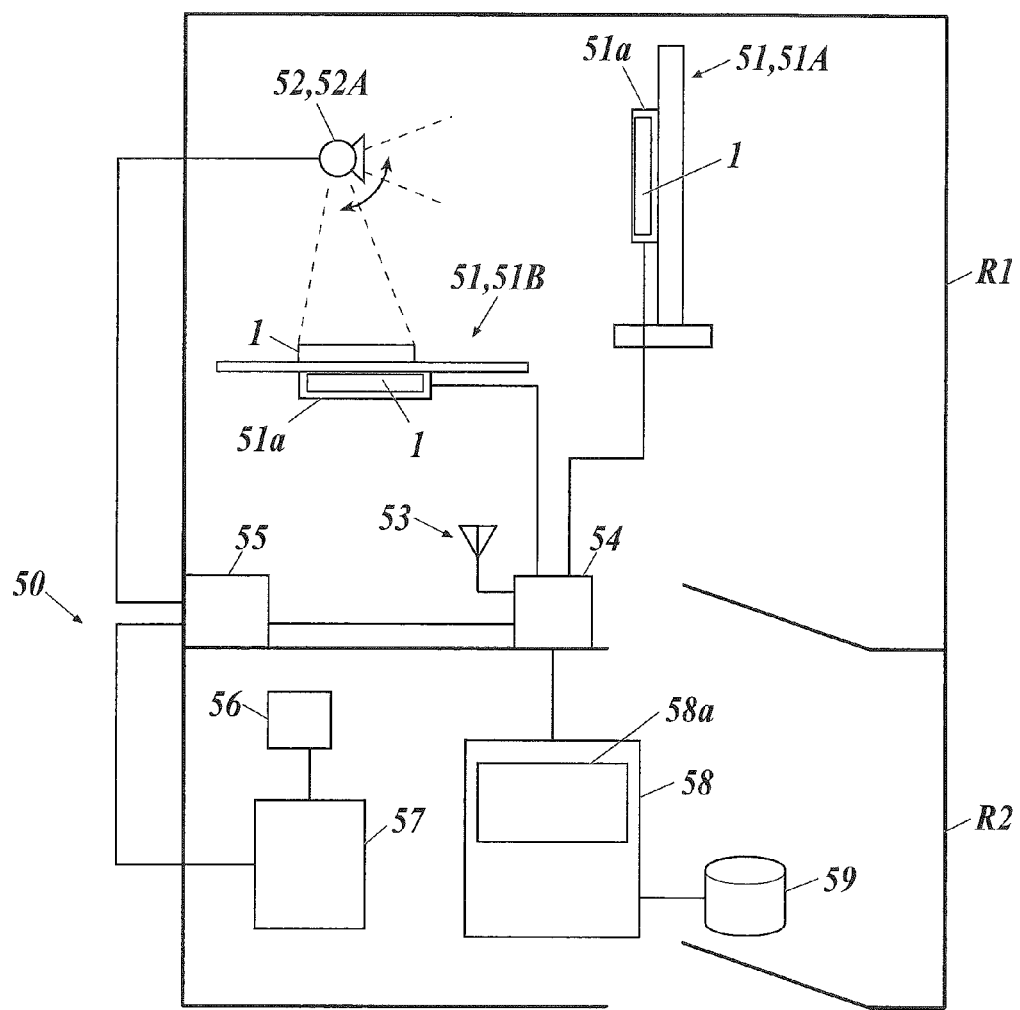
FIG. 4 illustrates an exemplary structure of a radiographic image capturing system of an embodiment installed in a capturing room.

The structure and other details of a radiographic image capturing apparatus of this embodiment will be described. FIG. 1 is a cross-sectional view of the radiographic image capturing apparatus of this embodiment. FIG. 2 is a plan view illustrating the structure of a substrate of the radiographic image capturing apparatus. In FIGS. 1 and 2 and other drawings, the components in the apparatus are not always accurately expressed in relative size, position, or other respects as in the actual apparatus. In the following description, "above" or "below", i.e., an expression associated with the vertical direction is relative to a radiographic image capturing apparatus 1 disposed on a virtual horizontal plane. Accordingly, when the radiographic image capturing apparatus 1 is used in an upright posture (for example, when the radiographic image capturing apparatus 1 is mounted in a Bucky unit 100 for capturing in a standing position as shown in FIG. 4 described below), the vertical direction refers to the horizontal direction (lateral or anteroposterior direction).

In this embodiment, as shown in FIG. 1, the radiographic image capturing apparatus 1 is composed of a housing 2 having a radiation incident plane R receiving radiation. The housing 2 contains a sensor panel SP including a scintillator 3 and a substrate 4. Although not shown in FIG. 1, the housing 2 of this embodiment includes an antenna 41 (see FIG. 3 described below) which is a communication unit wirelessly transmitting data including image data D and transmitting/receiving signals. Although not shown in FIG. 1, the radiographic image capturing apparatus 1 of this embodiment has a connector at, for example, a side of the housing 2, and can transmit/receive signals and data through the connector by wire communication.

Referring to FIG. 1, the housing 2 contains a base 31, and the substrate 4 lies on a thin lead plate (not shown) on a surface of the base 31, the surface being on a side where the radiation incident plane R (the upper surface of the base 31) is. The scintillator 3, which converts irradiated radiation into light, e.g., visible light, lies on the upper surface of the substrate 4 and a scintillator substrate 34 and faces the substrate 4. The sensor panel SP includes the substrate 4 and the scintillator 3. PCB substrates 33 on which electronic elements 32 and other elements are disposed, a battery 24, and other components are mounted on the lower surface of the base 31. In this embodiment, a cushioning material 35 is provided between the sensor panel SP and a side of the housing 2.

In this embodiment, the substrate 4 is a glass substrate. As shown in FIG. 2, a plurality of scanning lines 5 and a plurality of signal lines 6 are arrayed on the upper surface 4a (the surface facing the scintillator 3) of the substrate 4 so as to intersect with each other. Small regions r of the surface 4a of the substrate 4, which are defined by the plurality of scanning lines 5 and the plurality of signal lines 6, are each provided with a radiation detector 7. The small regions r defined by the scanning lines 5 and the signal lines 6 and provided with a two-dimensional array (a matrix) of a plurality of radiation detectors 7 are collectively referred to as a detecting area P indicated by a dot-and-dash line in FIG. 2. In this embodiment, the radiation detector 7 is a photodiode. Alternatively, the radiation detector 7 may be a phototransistor, for example.

Figure 3:
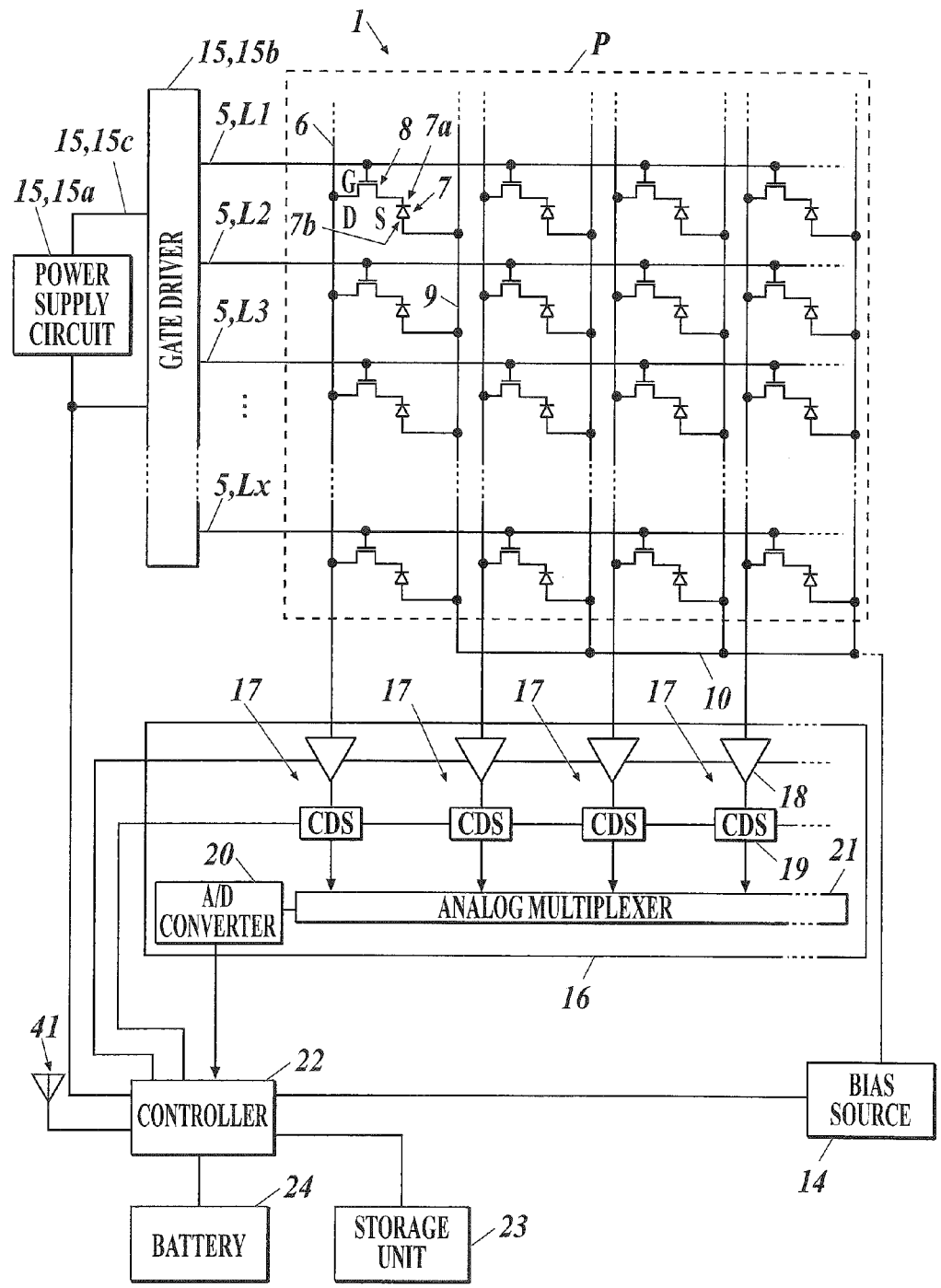
FIG. 3 is a block diagram of an equivalent circuit in a basic structure of the radiographic image capturing apparatus.

FIG. 3 is a block diagram of an equivalent circuit of the radiographic image capturing apparatus 1 of this embodiment. Each radiation detector 7 has a first electrode $7a$ connected to a source electrode $8s$ ("S" in FIG. 3) of a thin film transistor (TFT) 8 serving as a switching element. A drain electrode $8d$ and a gate electrode $8g$ ("D" and "G" in FIG. 3, respectively) of the TFT 8 are connected to a signal line 6 and a scanning line 5, respectively. In this embodiment, as shown in FIGS. 2 and 3, the radiation detectors 7 in one column on the substrate 4 are connected to one bias line 9 through the respective second electrodes $7b$ of the radiation detectors 7. Each bias line 9 is connected to a connection line 10 in a position outside of the detecting area P of the substrate 4. The connection line 10 is connected to a bias source 14 via an input/output terminal 11 (shown in FIG. 2, not shown in FIG. 3). The bias source 14 supplies a reverse bias voltage to the second electrodes $7b$ of the radiation detectors 7 through the connection line 10 and the bias lines 9.

Each scanning line 5 is connected to a gate driver $15b$ of a scanning driving unit 15. In the scanning driving unit 15, the ON-state voltage and the OFF-state voltage are supplied from a power supply circuit $15a$ to the gate driver $15b$ via a wire $15c$, and the gate driver $15b$ switches the voltage to the individual scanning lines 5 (L1-Lx) between the ON-state voltage and the OFF-state voltage. The TFT 8 is turned on with the ON-state voltage supplied from the scanning driving unit 15 to the gate electrode $8g$ through the scanning line 5 to release accumulated electric charge from the radiation detector 7 into the signal line 6. The TFT 8 is turned off with the OFF-state voltage supplied to the gate electrode $8g$ through the scanning line 5 to halt the release of the electric charge from the radiation detector 7 into the signal line 6 for the storage of the electric charge in the radiation detector 7.

Figure 5:
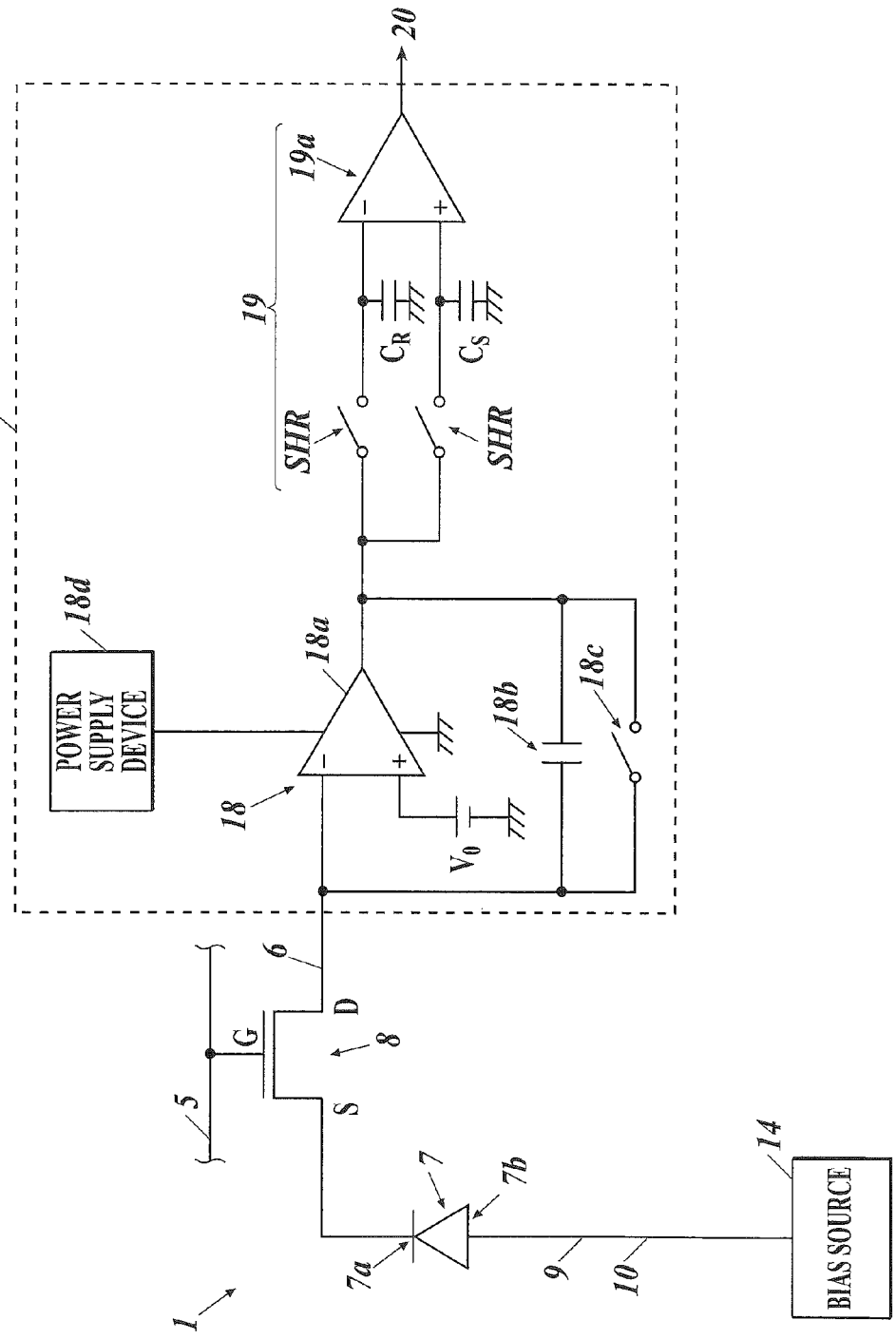
FIG. 5 is a block diagram of an equivalent circuit of a readout circuit and other components of the radiographic image capturing apparatus.

For reading the image data D from each radiation detector 7, the TFT 8 of the radiation detector 7 is turned on with the ON-state voltage to release electric charge from the radiation detector 7 into the signal line 6, and then into a corresponding readout circuit 17 provided in a readout IC 16. In this embodiment, as shown in FIG. 5 described below, an amplifier circuit 18 in the readout circuit 17 is a charge amplifier circuit composed of an operational amplifier $18a$, a capacitor $18b$, and other elements connected in parallel. In the amplifier circuit 18, a voltage dependent on the amount of the electric charge accumulated in the capacitor $18b$ is output from the output side of the operational amplifier $18a$. A correlated dual sampling circuit 19 feeds analog image data D to the downstream side, where the analog image data D represents a difference in the voltage at the output of the amplifier circuit 18 between before and after the electric charge is fed from the radiation detector 7. Pieces of the output analog image data D are sequentially transmitted to an analog multiplexer 21, and then to an A/D converter 20 where they are sequentially converted into digital image data D. The pieces of digital image data D are output to a storage unit 23 and sequentially stored in the storage unit 23. A process will be described in detail below of applying the ON-state voltage to the TFT 8 in the readout of the image data D. In FIG. 3, the correlated dual sampling circuit 19 is referred to as "CDS".

Although not shown in the drawing, a controller 22 includes a field programmable gate array (FPGA) and a computer composed of a central processing unit (CPU), a read only memory (ROM), a random access memory (RAM), an input/output interface, and other components which are connected to a bus. Alternatively, the controller 22 may be a dedicated controller. The controller 22 controls the operations of the functional components in the radiographic image capturing apparatus 1, for example, controls the scanning driving unit 15 and the readout circuit 17 for the execution of the readout of the image data D. Referring to FIG. 3, the controller 22 is connected to the storage unit 23 composed of a static RAM (SRAM), a synchronous DRAM (SDRAM), or any other device. In this embodiment, the controller 22 is connected to the antenna 41 and the battery 24 which supplies necessary power to the functioning components, such as the scanning driving unit 15, the readout circuit 17, the storage unit 23, and the bias source 14.

[Radiographic Image Capturing System]

The structure and other details of a radiographic image capturing system 50 of this embodiment will now be described. FIG. 4 illustrates an exemplary structure of a radiographic image capturing system 50 of this embodiment.

A capturing room R1 contains Bucky units 51A and 51B each having a cassette holder 51a on which the radiographic image capturing apparatus 1 can be mounted. The capturing room R1 contains at least one radiation source 52A for irradiating radiation toward the radiographic image capturing apparatus 1. The capturing room R1 contains a relay 54 for establishing communication between the devices in the capturing room R1 and devices outside the capturing room R1. The relay 54 has an access point 53. The relay 54 is connected to the radiation generator 55 and a console 58, and includes a converter (not shown) for converting local area network (LAN) signals which travel from the radiographic image capturing apparatus 1, the console 58, or other devices to the radiation generator 55, into signals readable in the radiation generator 55, and vice versa.

In this embodiment, a front room (operating room) R2 contains an operating device 57 for controlling the radiation generator 55. The operating device 57 has an emission switch 56 operated by an operator, such as a radiological technologist, to instruct the radiation generator 55 to emit radiation, for example. The front room R2 contains the console 58 composed of a computer provided with a display 58a and a storage unit 59. The console 58 may be provided in other suitable places, for example, in the exterior of the capturing room R1 and the front room R2 or in any other room. In this embodiment, the console 58 also serves as an image processor. Upon the reception of the image data D or other information from the radiographic image capturing apparatus 1, the console 58 carries out precise image processing, involving offset correction, gain correction, defective pixel correction, and grayscale processing according to capturing site, based on such data, to generate a radiographic image. Alternatively, an image processor may be provided independently of the console 58. The radiographic image capturing apparatus 1 may be used alone independently without being mounted on the Bucky unit 51A or 51B.

[Process for Detecting Start of Irradiation with Radiation]

The radiographic image capturing apparatus 1 of this embodiment can independently detect the start and end of the irradiation with radiation. Such a radiographic image capturing apparatus 1 may have various structures for independently detecting the start and end of the irradiation with radiation. Any structure may be employed as long as the radiographic image capturing apparatus 1 can independently detect the start and end of the irradiation with radiation. Examples of such a structure will now be briefly described.

[Detecting Process 1]

The radiographic image capturing apparatus 1 includes a detecting unit, such as a radiation sensor, in which an output value increases when irradiated with radiation, and an output value reduces after the irradiation with radiation. The output of the detecting unit is fed into the controller 22 in the radiographic image capturing apparatus 1. The controller 22 detects the start of irradiation when the output value of the detecting unit is equal to or exceeds a predetermined threshold. The controller 22 detects the end of the irradiation when the output value of the detecting unit falls from equal to or above the predetermined threshold to below the predetermined threshold (the value may be the same as the above threshold or a different value).

[Detecting Process 2]

The current flowing through the bias line 9 and the connection line 10 increases upon the irradiation of the radiographic image capturing apparatus 1 with radiation, and the current flowing through the bias line 9, etc. decreases after the irradiation. This phenomenon is used to detect the start and end of the irradiation. Refer, for example, to Japanese Unexamined Patent Application Publication No. 2009-219538 for the details of the corresponding configuration.

[Detecting Process 3]

For determining the leakage data $d_{leak}$, each readout circuit 17 reads electric charge q leaking from the radiation detector 7 through the TFT 8 kept in the off state by the OFF-state voltage supplied from the gate driver 15b through the scanning line 5. Upon the start of the irradiation of the radiographic image capturing apparatus 1 with radiation, the amount of the electric charge q increases, resulting in a sudden rise in the read leakage data $d_{leak}$. After the irradiation with radiation, the leakage data $d_{leak}$ decreases. Such a phenomenon is used to detect the start and end of the irradiation with radiation based on the leakage data $d_{leak}$. Refer, for example, to WO2011/135917 and Japanese Unexamined Patent Application Publication No. 2012-176155 for the details of the detecting process 3.

The start and other timings of the irradiation with radiation may be detected by any one of the detecting processes or the concurrent execution of these two or three detecting processes.

[Readout of Image Data]

In this embodiment, each readout circuit 17 in the radiographic image capturing apparatus 1 has a configuration shown in FIG. 5, for example. In particular, the readout circuit 17 has the amplifier circuit 18 which is a charge amplifier circuit including the operational amplifier 18a, the capacitor 18b and an electric charge resetting switch 18c connected to the operational amplifier 18a in parallel, and a power supply device 18d supplying power to the operational amplifier 18a and other components. In this embodiment, the operational amplifier 18a of the amplifier circuit 18 has an inverting input terminal connected to the signal line 6 and a non-inverting input terminal at a reference potential $V_O$ with a predetermined voltage, for example, +0.8 V.

With the electric charge resetting switch 18c in the off state, the electric charge flowing from the radiation detector 7 into the amplifier circuit 18 through the signal line 6 is stored in the capacitor 18b, and a voltage corresponding to the amount of the electric charge in the capacitor 18b is output from the operational amplifier 18a. The output of the operational amplifier 18a is connected to two branches, i.e., the inverting input terminal of the operational amplifier 19a of the correlated dual sampling circuit 19 through a reference switch SHR, and the non-inverting input terminal of the operational amplifier 19a of the correlated dual sampling circuit 19 through a signal switch SHS. The on/off of the electric charge resetting switch 18c of the amplifier circuit 18 and the reference switch SHR and signal switch SHS of the correlated dual sampling circuit 19 are operated by the controller 22 in the radiographic image capturing apparatus 1. A reference capacitor $C_R$ is connected between the reference switch SHR and the inverting input terminal of the operational amplifier 19a, while a signal capacitor $C_S$ is connected between the signal switch SHS and the non-inverting input terminal of the operational amplifier 19a. The reference capacitor $C_R$ and the signal capacitor $C_S$ are grounded at their one electrode.

Figure 6:
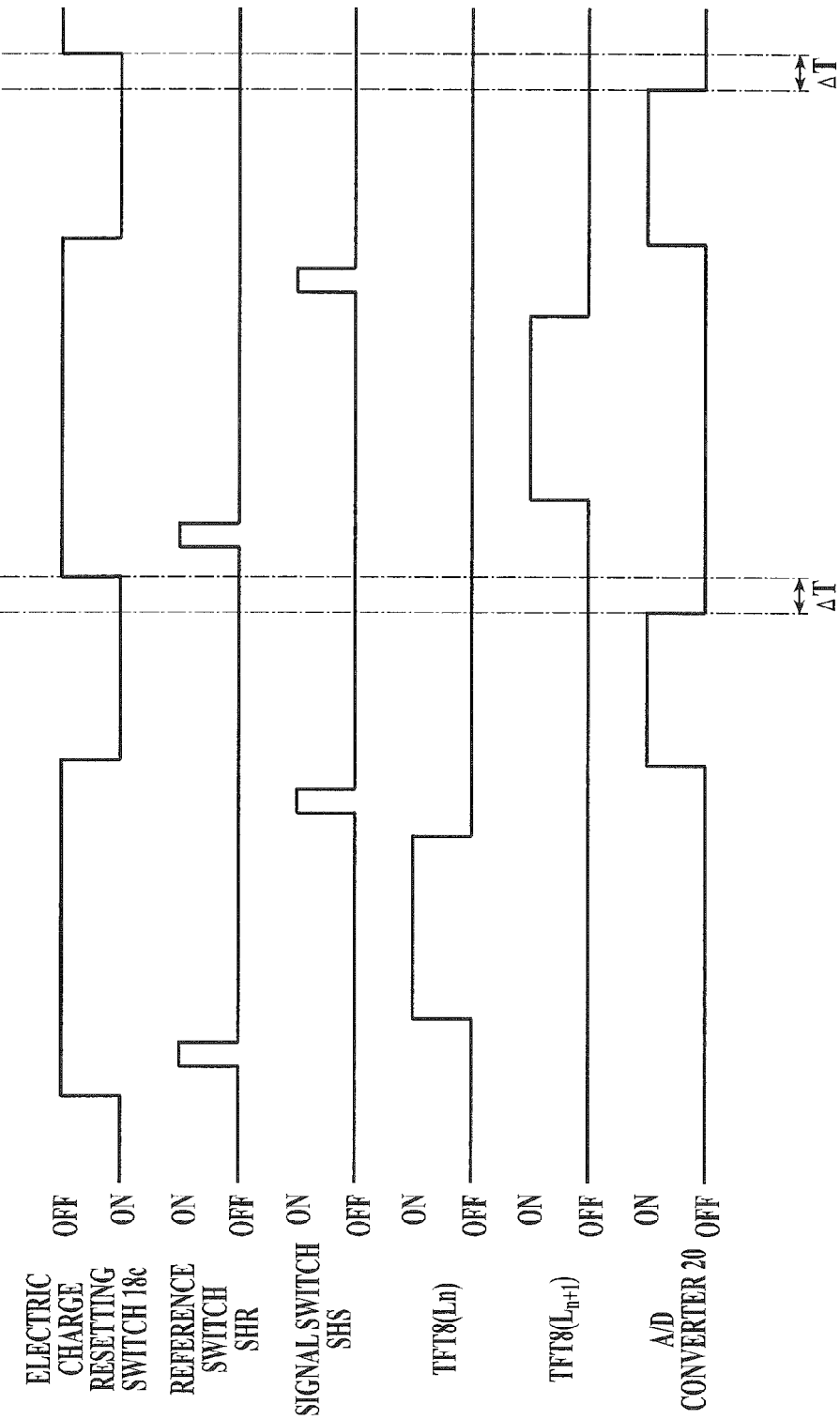
FIG. 6 is a timing chart showing the timing of the application of ON-state voltage to the switches in the readout circuit, scanning lines, and other elements during the readout of image data.

For the readout of the image data D in this embodiment, as shown in FIG. 6, the controller 22 switches the electric charge resetting switch 18c of the amplifier circuit 18 in the readout circuit 17 from the on state to the off state, and then applies a pulse voltage to the reference switch SHR of the correlated dual sampling circuit 19, so that the voltage at the output of the operational amplifier 18a of the amplifier circuit 18 at this time point is held (sampled and held) in the reference capacitor $C_R$. At the time, substantially no electric charge is stored in the capacitor 18b of the amplifier circuit 18, so that a low voltage corresponding to the above is produced at the output of the operational amplifier 18a of the amplifier circuit 18 and is held in the reference capacitor $C_R$ of the correlated dual sampling circuit 19.

The controller 22 then causes the gate driver 15b of the scanning driving unit 15 (shown in FIG. 3 and other drawings, omitted in FIG. 5) to apply the ON-state voltage to a line Ln of the scanning line 5 to turn on the TFTs 8 connected to the line Ln of the scanning line 5. The electric charge stored in each radiation detector 7 is released into the signal line 6 through the TFT 8 in the on state, and then stored in the capacitor 18b of the amplifier circuit 18. This increases the voltage value at the output of the operational amplifier 18a of the amplifier circuit 18. The controller 22 causes the gate driver 15b to switch the charge applied to the line Ln of the scanning line 5 from the ON-state voltage to the OFF-state voltage to turn off the TFTs 8 connected to the line Ln of the scanning line 5, and then applies a pulse voltage to the signal switch SHS of the correlated dual sampling circuit 19, so that the voltage at the output of the operational amplifier 18a of the amplifier circuit 18 is held (sampled and held) in the signal capacitor $C_S$. In this state, the operational amplifier 19a of the correlated dual sampling circuit 19 outputs a difference between the voltage held in the signal capacitor $C_S$ and the voltage held in the reference capacitor $C_R$. The difference corresponds to the analog image data D. As described above, pieces of the analog image data D are sequentially fed into the A/D converter 20 through the analog multiplexer 21 (see FIG. 3, for example) and sequentially converted into digital image data D in the A/D converter 20. Thus, the image data D is read from the radiation detectors 7 connected to the line Ln of the scanning line 5.

The readout of the image data D includes applying the ON-state voltage to the scanning lines 5 in sequence. In particular, as shown in FIG. 6, the readout of the image data D from the radiation detectors 7 connected to the line Ln of the scanning line 5 is followed by the readout of the image data D from the radiation detectors 7 connected to the next line Ln+1 of the scanning line 5. In this embodiment, the controller 22 can control the interval ΔT (see FIG. 6) between the end of the conversion in the A/D converter 20 for the readout of the image data D from the radiation detectors 7 connected to the line Ln of the scanning line 5, and the start of the readout of the image data D from the radiation detectors 7 connected to the next line Ln+1 of the scanning line 5.

The control of the interval ΔT allows for the adjustment of the time (referred to as "image data D reading time") required for reading the image data D from all the installed radiation detectors 7 or the radiation detector(s) 7 as the target to read out the image data D. In place of or in combination with the control of the interval ΔT, the image data D reading time may be adjusted by variations of the term during the application of the ON-state voltage among the lines Ln of the scanning lines 5, and according to the above, variations of the term from the application of a pulse voltage to the reference switch SHR to the application of a pulse voltage to the signal switch SHS.

[Configuration and Other Details Specific to this Embodiment]

A configuration and other details will now be described for avoiding an overlap between the timing of the irradiation with radiation and the timing of the readout of the image data D in the radiographic image capturing apparatus 1 that can independently detect the start and end of the irradiation with radiation as described above during the capture of moving images, for example. In addition, described below are the operations on the radiographic image capturing apparatus 1 and the radiographic image capturing system 50 of this embodiment. In the following description, "moving images or other images" include normal moving images generated by the capture of, for example, 30 frames per second and quasi-moving images produced by irradiating a subject with radiation in sequence at a rate, for example, of 10 frames per second or one frame for several seconds.

Figure 7:
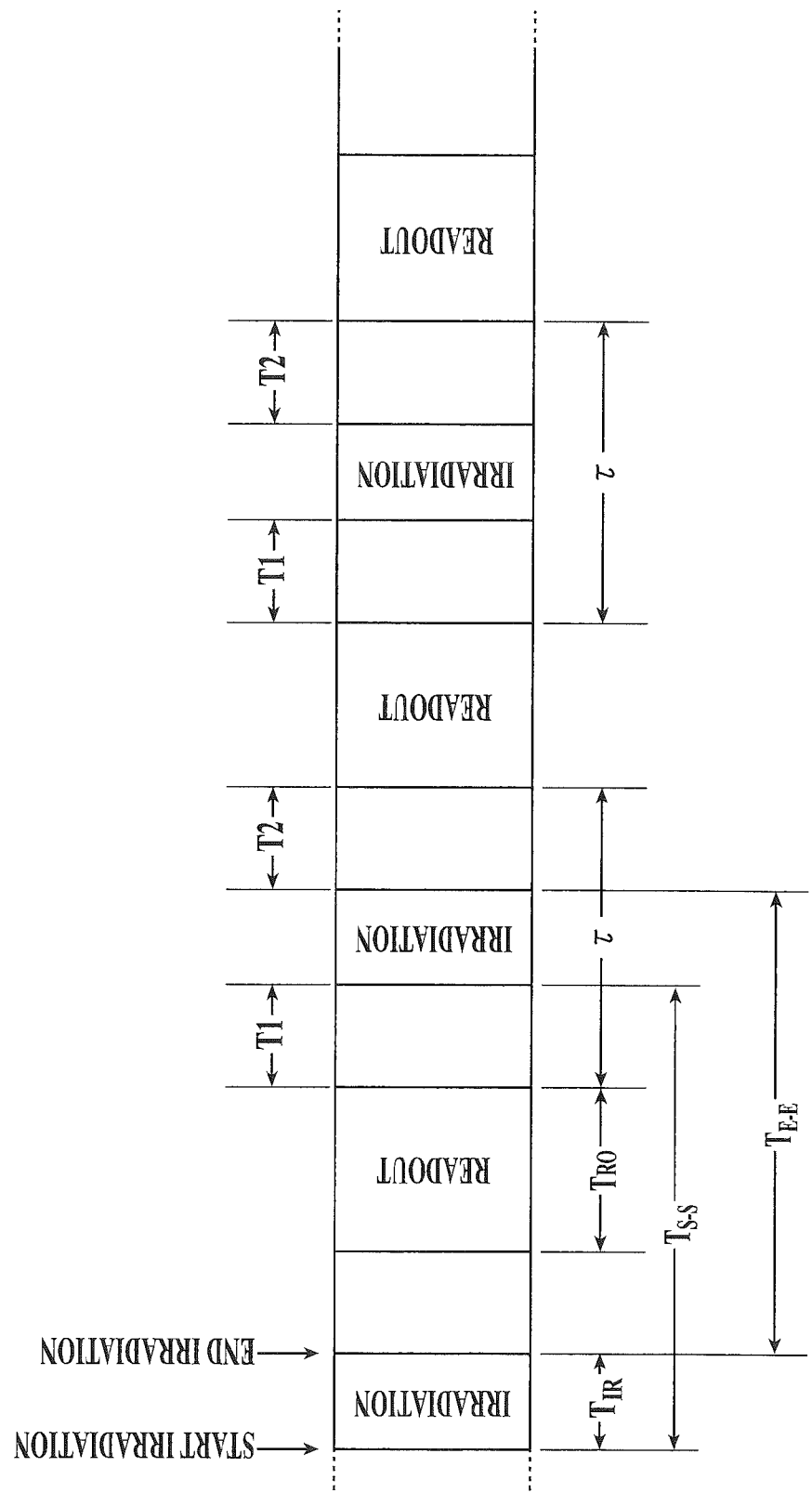
FIG. 7 shows that a process for capturing moving images or other images alternates between the irradiation of radiation and the readout of image data and indicates the time required for the irradiation time and the readout of image data, the standby time, the first period, and the second period.

With reference to FIG. 7, a series of radiographic image capturing for moving images involves the irradiation with radiation from the radiation generator 55 ("irradiation" in the drawing) and the readout of the image data D in the radiographic image capturing apparatus 1 ("readout" in the drawing) which are alternately performed. As described above, the cycle of the irradiation with radiation from the radiation generator 55 and the irradiation time during the irradiation with radiation are preferably fixed throughout a series of radiographic image capturing for moving images or other images, although the cycle or the irradiation time may not always be fixed in practice. To solve such a problem, the controller 22 in the radiographic image capturing apparatus 1 detects times t1 and t2 at which the start and end of the irradiation with radiation are detected, determines a difference between them as irradiation time $T_{IR}$, and stores the time $T_{IR}$ in every irradiation. In the following description, as shown in FIG. 7, the irradiation time, i.e., the time during the irradiation of the radiographic image capturing apparatus 1 with radiation from the radiation generator 55 (in practice, the time from when the start of the irradiation with radiation is detected by the controller 22 in the radiographic image capturing apparatus 1 to when the end of the irradiation with radiation is detected by the controller 22) is denoted as $T_{IR}$, and the image data D reading time is denoted as $T_{RO}$. In FIG. 7 and other drawings described below, the time, such as the irradiation time $T_{IR}$ and the image data D reading time $T_{RO}$, do not always reflect actual relative lengths.

As described above, for the readout of the image data D in this embodiment, the image data D reading time $T_{RO}$ (see FIG. 7) during the readout of the image data D from each radiation detector 7 can be controlled by adjusting the interval ΔT (see FIG. 6) between the end of the readout of the image data D from the radiation detectors 7 connected to the line Ln of the scanning line 5, and the start of the readout of the image data D from the radiation detectors 7 connected to the next line $L_{n+1}$ of the scanning line 5. In the normal operation (in other words, in the default state), the interval ΔT is maximized to maximize the image data D reading time $T_{RO}$. It should be appreciated that the time $T_{RO}$ is no longer than necessary and is set relatively long within a usual time range.

As shown in FIG. 7, the controller 22 in the radiographic image capturing apparatus 1 in this embodiment calculates the cycle $T_X$ during the irradiation with radiation from the radiation generator 55 according to Expression (1), where $T_{S-S}$ is the time from the start of an irradiation of radiation shot by the radiation generator 55 to the start of the irradiation of radiation by the radiation generator 55 in the next capturing, and $T_{E-E}$ is the time from the end of an irradiation of radiation shot by the radiation generator 55 to the end of the irradiation of radiation by the radiation generator 55 in the next capturing. In particular, the controller 22 in this embodiment determines the average of $T_{S-S}$ and $T_{E-E}$ as the cycle $T_X$ of the irradiation with radiation from the radiation generator 55. The cycle $T_X$ is calculated for every radiographic capturing. Alternatively, the time $T_{S-S}$ or $T_{E-E}$ may be determined as the cycle $T_X$.

$$T_X=(T_{S-S}+T_{E-E})/2 \qquad (1)$$

In this embodiment, the controller 22 in the radiographic image capturing apparatus 1 provides a standby time τ (see FIG. 7) from the end of the current readout of the image data D to the start of the readout of the image data D in the next capturing and, as described below, adjusts the standby time τ as needed during the readout of the image data D.

Figure 8A:
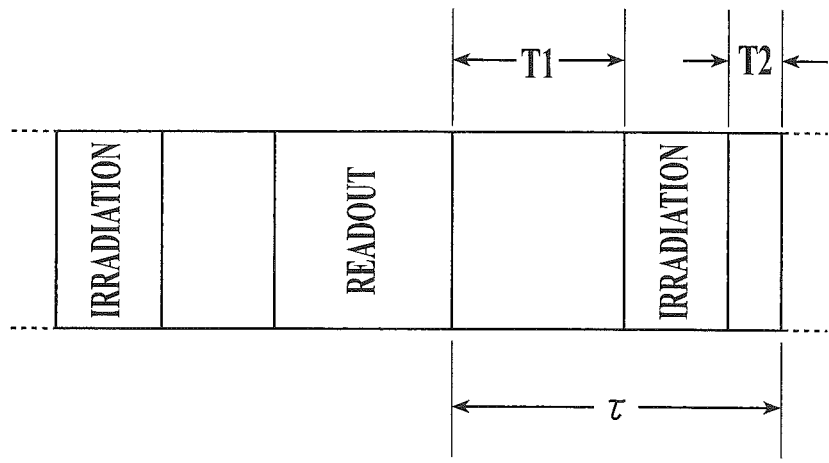
FIG. 8A illustrates a second period shortened.

As mentioned above, the irradiation time $T_{IR}$ and the irradiation cycle $T_X$ of the radiographic image capturing apparatus 1 with radiation from the radiation generator 55 are not always fixed. With reference to FIG. 8A, a delay in the irradiation in the next irradiation with radiation (i.e., an increase in the cycle $T_X$) extends a first period T1 from the end of the readout of the image data D in the current capturing to the start of the irradiation with radiation in the next capturing, but shortens a second period T2 from the end of the irradiation with radiation in the next capturing to the start of the readout of the image data D in the next capturing. In contrast, referring to FIG. 8B, for example, premature irradiation with radiation in the next capturing (i.e., a reduction in the cycle $T_X$) shortens the first period T1 from the end of the readout of the image data D in the current capturing to the start of the irradiation with radiation in the next capturing.

To solve such a problem, the controller 22 in the radiographic image capturing apparatus 1 in this embodiment adjusts the standby time τ from the end of the current readout of the image data D to the start of the readout of the image data D in the next capturing to minimize a difference in length between the first period T1 and the second period T2, preventing an overlap between the timing of the irradiation with radiation and the timing of the readout of the image data D despite fluctuations in the irradiation time $T_{IR}$ and the irradiation cycle $T_X$ of the radiographic image capturing apparatus 1 with radiation from the radiation generator 55. Similarly, during the readout of the image data D, the interval ΔT (see FIG. 6) is controlled to adjust the image data D reading time $T_{RO}$ such that the difference in length is minimized between the first period T1 and the second period T2.

Specifically, the radiographic image capturing apparatus 1 is irradiated in advance with radiation from the radiation generator 55 one or more times before the capturing, and the start and end of the irradiation are detected by the radiographic image capturing apparatus 1 in every irradiation with radiation to calculate the cycle $T_X$ according to Expression (1).

With reference to FIG. 7, if the cycle $T_X$ equals $T_{S-S}$, the cycle $T_X$ is expressed as:

$$T_X=T_{IR}+T2+T_{RO}+T1 \qquad (2).$$

The difference in length between the first period T1 and the second period T2 is minimized as described above. In the most ideal state, T1 = T2. At T1 = T2, Expression (2) can be represented by:

$$T1=T2=(T_X-T_{IR}-T_{RO})/2 \qquad (3).$$

Thus, the controller 22 in the radiographic image capturing apparatus 1 in this embodiment determines the initial values of the first period T1 and the second period T2 from the following variables: the irradiation time $T_{IR}$ based on more than one advance irradiations before the capturing, the determined cycle $T_X$, and the predetermined image data D reading time $T_{RO}$.

The controller 22 in the radiographic image capturing apparatus 1 adjusts the standby time τ and the readout time $T_{RO}$ to minimize the difference in length between the first period T1 and the second period T2, preventing an overlap between the timing of the irradiation with radiation and the timing of the readout of the image data D despite fluctuations in the irradiation time $T_{IR}$ of the radiation and the irradiation cycle $T_X$ of the radiographic image capturing apparatus 1 with radiation from the radiation generator 55. A process will now be described in detail of the adjustment of the standby time τ and the readout time $T_{RO}$ in the controller 22 in the radiographic image capturing apparatus 1 with reference to Table 1.

TABLE 1

| | FIRST PERIOD T1 | | |
|---|---|---|---|
| | T1 ≤ REFERENCE VALUE α (T1 ≤ α) | T1 ≤ REFERENCE VALUE β (T1 ≤ β) | T1 > REFERENCE VALUE β (T1 > β) |
| SECOND PERIOD T2 | | | |
| T2 ≤ REFERENCE VALUE α (T2 ≤ α) | SHORTEN READOUT TIME $T_{RO}$ EXTEND STANDBY TIME τ | EXTEND STANDBY TIME τ | EXTEND STANDBY TIME τ |
| T2 ≤ REFERENCE VALUE β (T2 ≤ β) | SHORTEN STANDBY TIME τ | SHORTEN READOUT TIME $T_{RO}$ SHORTEN STANDBY TIME τ | EXTEND STANDBY TIME τ |
| T2 > REFERENCE VALUE β (T2 > β) | SHORTEN STANDBY TIME τ | SHORTEN STANDBY TIME τ | UNCHANGED |

As shown in Table 1, the controller 22 in this embodiment establishes two reference values for each of the first period T1 and the second period T2. These reference values are referred to as a reference value α and a reference value β (0<reference value α<reference value β). In this embodiment, the reference values α and β for the first period T1 are equal to those for the second period T2. Alternatively, the reference values α etc. for the first period T1 may be different from those for the second period T2.

Figure 8B:
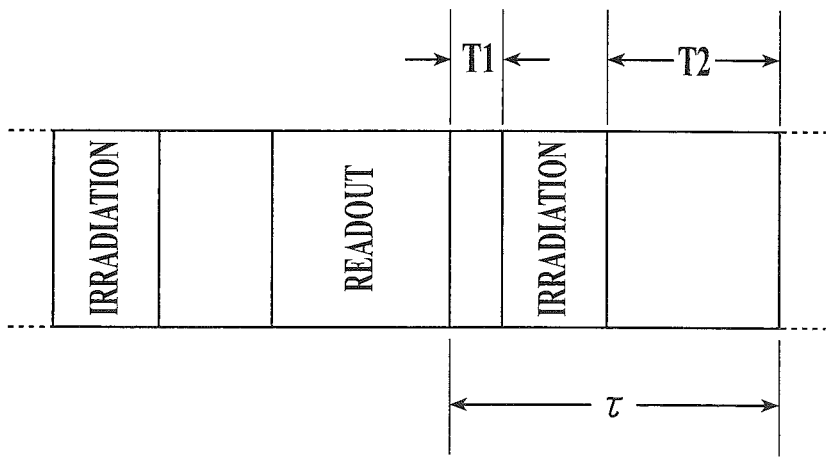
FIG. 8B illustrates a first period shortened.

If both the first period T1 and the second period T2 are higher than the reference value β and sufficiently long between the preceding readout of the image data D to the current readout of the image data D (which state is shown in the bottom-right corner of Table 1), an overlap would probably be prevented between the timing of the irradiation with radiation and the timing of the readout of the image data D despite premature or delayed irradiation with radiation in the next capturing illustrated in FIGS. 8A and 8B. In such a case, the controller 22 in the radiographic image capturing apparatus 1 does not adjust the readout time $T_{RO}$ in the next capturing and the standby time τ (from the end of the readout of the image data D in the current capturing to the start of the readout of the image data D in the next capturing), i.e., leaves it unchanged by setting the standby time τ at the same value as in the preceding capturing.

The column in the vertical direction including the cell "unchanged" on the bottom-right corner of Table 1 represents the following state: the first period T1 (from the end of the readout of the image data D in the preceding capturing to the start of the irradiation with radiation in the current capturing) is higher than the reference value β, and the second period T2 (from the end of the irradiation with radiation in the current capturing to the start of the readout of the image data D in the current capturing) is lower than or equal to the reference values α and β. Such a state is schematically shown in FIG. 8A. A delay in the irradiation timing with radiation in the next capturing may cause an overlap between the timing of the irradiation with radiation and the timing of the readout of the image data D.

In such a case, as shown in Table 1, the controller 22 in the radiographic image capturing apparatus 1 sets a standby time τ (from the end of the current readout of the image data D to the start of the readout of the image data D in the next capturing) in FIG. 7 to be longer than the previously set standby time τ. Setting the standby time τ longer can extend the second period T2 in FIG. 8A, which certainly prevents an overlap between the timing of the irradiation with radiation and the timing of the readout of the image data D in the next capturing.

The standby time τ can be determined (extended) such that the second period T2 in the next capturing is equal to the second period T2 calculated according to Expression (3) based on the cycle $T_X$, the irradiation time $T_{IR}$, and other variables related to the preceding capturing. This also applies to the shortening of the standby time τ described below.

With reference to Table 1, the controller 22 in the radiographic image capturing apparatus 1 in this embodiment sets the current standby time τ (from the end of the current readout of the image data D to the start of the readout of the image data D in the next capturing) longer than the preceding standby time τ if the first period T1 is less than or equal to the reference value β and if the second period T2 is less than or equal to the reference value α. In such a case, the first period T1 still has a satisfactory length even though it is less than or equal to the reference value β, while the second period T2 no longer has a satisfactory length at a value less than or equal to the reference value α. Such a state is also schematically shown in FIG. 8A. A delay of the irradiation timing with radiation in the next capturing may cause an overlap between the timing of the irradiation with radiation and the timing of the readout of the image data D. For this reason, the standby time τ is increased to extend the second period T2, which certainly prevents an overlap between the timing of the irradiation and the timing of the readout of the image data D in the next capturing.

The line in the horizontal direction including the cell "unchanged" on the bottom-right in Table 1 represents the following state: the second period T2 (from the end of the irradiation with radiation in the current capturing to the start of the readout of the image data D in the current capturing) is higher than the reference value β, and the first period T1 (from the end of the readout of the image data D in the preceding capturing to the start of the irradiation with radiation in the current capturing) is lower than or equal to the reference values α and β. Such a state is schematically shown in FIG. 8B. Premature irradiation with radiation in the next capturing may cause an overlap between the timing of the readout of the image data D and the timing of the irradiation with radiation.

In such a case, as shown in Table 1, the controller 22 in the radiographic image capturing apparatus 1 sets the standby time τ (from the end of the current readout of the image data D to the start of the readout of the image data D in the next capturing) in FIG. 7 to be shorter than the previously set standby time τ. Setting the standby time τ shorter can reduce the second period T2 in FIG. 8B and thus extend the first period T1 after the next readout of the image data D, which certainly prevents an overlap between the timing of the readout of the image data D in the next capturing and the timing of the irradiation with radiation after the next irradiation.

With reference to Table 1, the controller 22 in the radiographic image capturing apparatus 1 in this embodiment sets the current standby time τ (from the end of the current readout of the image data D to the start of the readout of the image data D in the next capturing) to be shorter than the previously set standby time τ if the second period T2 is less than or equal to the reference value β and if the first period T1 is less than or equal to the reference value α. In such a case, the second period T2 still has a sufficient length even though it is less than or equal to the reference value β, while the first period T1 no longer has a sufficient length at a value less than or equal to the reference value α. Such a state is also schematically shown in FIG. 8B. Premature irradiation timing with radiation in the next capturing may cause an overlap between the timing of the readout of the image data D and the timing of the irradiation with irradiation. For this reason, the standby time τ is reduced to extend the first period T1, which certainly prevents an overlap between the timing of the readout of the image data D in the next capturing and the timing of the irradiation with the radiation after the next irradiation.

Figure 9:
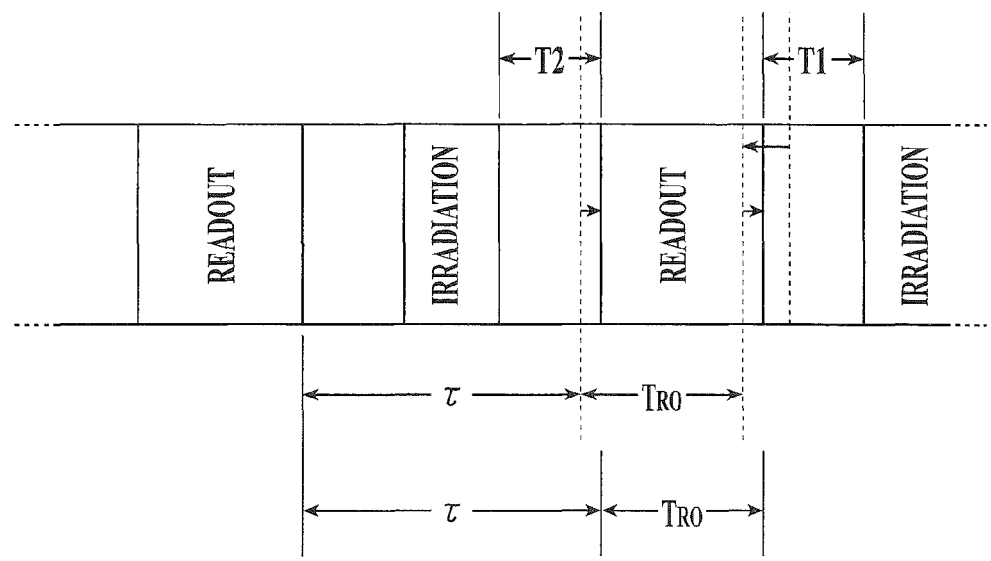
FIG. 9 shows that a reduced readout time and an increased standby time extend both the first period and the second period.

With reference to Table 1, if both the first period T1 and the second period T2 are less than or equal to the reference value α or β, the controller 22 in the radiographic image capturing apparatus 1 shortens the image data D reading time $T_{RO}$ (readout time $T_{RO}$) and sets the standby time τ (from the end of the current readout of the image data D to the start of the readout of the image data D in the next capturing) to be longer than the previously set standby time τ. This process is aimed at extending both the first period T1 and the second period T2 according to the above-described rules, rather than extending only either one of the first period T1 or the second period T2. In particular, as shown in FIG. 9, simply shortening the readout time $T_{RO}$ extends the first period T1, but not the second period T2 in the next capturing. Shortening the readout time $T_{RO}$ and extending the standby time τ can increase both the first period T1 and the second period T2.

After the readout time $T_{RO}$ is shortened to a minimum length, only the standby time τ is adjusted. Although not shown in Table 1, when one or both of the first period T1 and the second period T2 becomes higher than the reference value β after the readout time $T_{RO}$ is shortened, the readout time $T_{RO}$ is increased at once or gradually to the original length. In this embodiment, as shown in Table 1, the first period T1 and the second period T2 are controlled in different ways depending on their lengths which are categorized into three levels: less than or equal to the reference value α, less than or equal to the reference value β, and above the reference value β. Alternatively, the lengths of the first period T1 and the second period T2 may be each categorized into, for example, two levels (i.e., levels above and less than or equal to a reference value) or may be each categorized into more levels.

[Advantageous Effects]

As described above, in a series of radiographic image capturing including sequentially capturing moving images or other images of a subject, the controller 22 in the radiographic image capturing apparatus 1 of this embodiment determines whether the standby time τ (from the end of the readout of the image data D to the start of the readout of the image data D in the next capturing) is adjusted, depending on the first period T1 (from the end of the readout of the image data D in the preceding capturing to the start of the irradiation with radiation in the current capturing) and the second period T2 (from the end of the current irradiation with radiation to the start of the readout of the image data D). Referring to Table 1, the controller 22 does not adjust the standby time τ and leaves it unchanged when both the first period T1 and the second period T2 have a satisfactory length, reduces the standby time τ when the first period T1 is shortened (see FIG. 8B), and extends the standby time τ when the second period T2 is shortened (see FIG. 8A).

This insures prevention of an overlap between the timing of the irradiation with radiation and the timing of the readout of the image data D, the overlap including the start of the readout of the image data D during the irradiation with radiation and the start of the irradiation with radiation during the readout of the image data D in the next capturing. Such accurate adjustment of the standby time τ insures prevention of an overlap between the timing of the irradiation with radiation and the timing of the readout of the image data D and allows for an accurate radiographic image capturing for moving images or other images, despite variations in the cycle $T_X$ during the irradiation with radiation from the radiation generator 55 and in the irradiation time $T_{IR}$ (see FIG. 7) during the irradiation with radiation during the capture of moving images or other images.

As in the following embodiments, the controller 22 in the radiographic image capturing apparatus 1 in this embodiment determines whether the standby time τ (from the end of the current readout of the image data D to the start of the readout of the image data D in the next capturing) is adjusted depending on the lengths of the first period T1 and the second period T2. The sum of the readout time $T_{RO}$ and the standby time τ is equal to the cycle of initiating the readout of the image data D in each capturing (i.e., readout cycle or readout interval) or the cycle of terminating the readout of the image data D in each capturing (i.e., readout terminating cycle or readout terminating interval). In place of adjusting the standby time τ in a manner according to this embodiment, the readout cycle or the readout terminating cycle may be adjusted. However, even in such configuration, the contents of adjustment is the same process as the adjustment of the standby time τ according to this embodiment.

[Generation of Radiographic Images in Image Processor]

Described below is the generation of radiographic images in an image processor in the above-described radiographic image capturing apparatus 1. In this embodiment, the console 58 functions as an image processor 58, as mentioned above, and therefore the console 58 is described as the image processor 58. As described above, an image processor may be provided independently of the console 58.

Each radiation detector 7 (see FIG. 3) on the sensor panel SP of the radiographic image capturing apparatus 1 always generates dark electric charge (also referred to as "dark current") due to thermal excitation by self-heating (temperature) of the detector 7. A change in the standby time τ (from the end of the readout of the image data D to the start of the readout of the image data D in the next capturing) shown in FIG. 7 and other drawings leads to a change in the time Tac that indicates the time during which the TFT 8 is in the off state from the former readout of the image data D to the latter readout of the image data D, i.e., time during which dark electric charge is stored (referred to as "effective storage time"). This results in a change in the amount of dark electric charge stored in the radiation detector 7. The dark electric charge (i.e., offset) is superimposed on the read image data D during the readout of the image data D. A change in the standby time τ leads to a change in the effective storage time Tac, which results in a change in the amount of dark electric charge stored in the radiation detector 7, and thus a change in the offset corresponding to the dark electric charge superimposed on the read image data D.

In this embodiment, the controller 22 in the radiographic image capturing apparatus 1 sends to the image processor 58 the image data D (generated by a series of capturing for moving images or other images) together with information on the standby time τ before the start of the readout of image data D, i.e., the standby time τ from the end of the preceding readout of the image data D to the start of the current readout of the image data D.

Alternatively, the image data may be sent together with information on the effective storage time Tac. The image processor 58 performs accurate image processes, such as offset correction, gain correction, defective pixel correction, and grayscale processing according to capturing site, based on the attached information on the standby time τ or other time range, to generate a radiographic image. In such a case, the image processor 58 may preliminarily prepare offset data O for the offset correction of the image data D for each radiation detector 7 in the radiographic image capturing apparatus 1. Thus, the offset data O can be prepared every variable standby time τ. Alternatively, the image processor 58 may prepare reference offset data O for each radiation detector 7, and then correct the reference offset data according to the effective storage time Tac calculated from the standby time τ or other time range (or according to the effective storage time Tac transmitted from the radiographic image capturing apparatus 1); thus, the corrected reference offset data O is used for the offset correction.

Alternatively, before or after a series of capturing for moving images or other images, the offset data O for each radiation detector 7 is determined by the readout during which the radiographic image capturing apparatus 1 does not emit radiation, and then is transmitted to the image processor 58 where the determined offset data O is corrected according to the effective storage time Tac based on the standby time τ or other time range to be used for the offset correction.

Furthermore, the offset data O corrected by Expression (4) using the effective storage time Tac is subtracted from the image data D. This operation can accurately remove the offset due to the dark electric charge from the read image data D even if the standby time τ is changed, resulting in changes in the effective storage time Tac, the amount of dark electric charge stored in the radiation detector 7, and thus the offset due to the dark electric charge superimposed on the image data D.

$$D^* = D - O \quad (4)$$

Expression (4) represents that the actual image data D* is image data D dependent on only electric charge generated by irradiation with radiation without effect of the dark electric charge. Radiographic images are generated based on the actual image data D*, and the radiographic images can be accurately generated independent of changes in the standby time τ and the effective storage time Tac.

Figure 10:
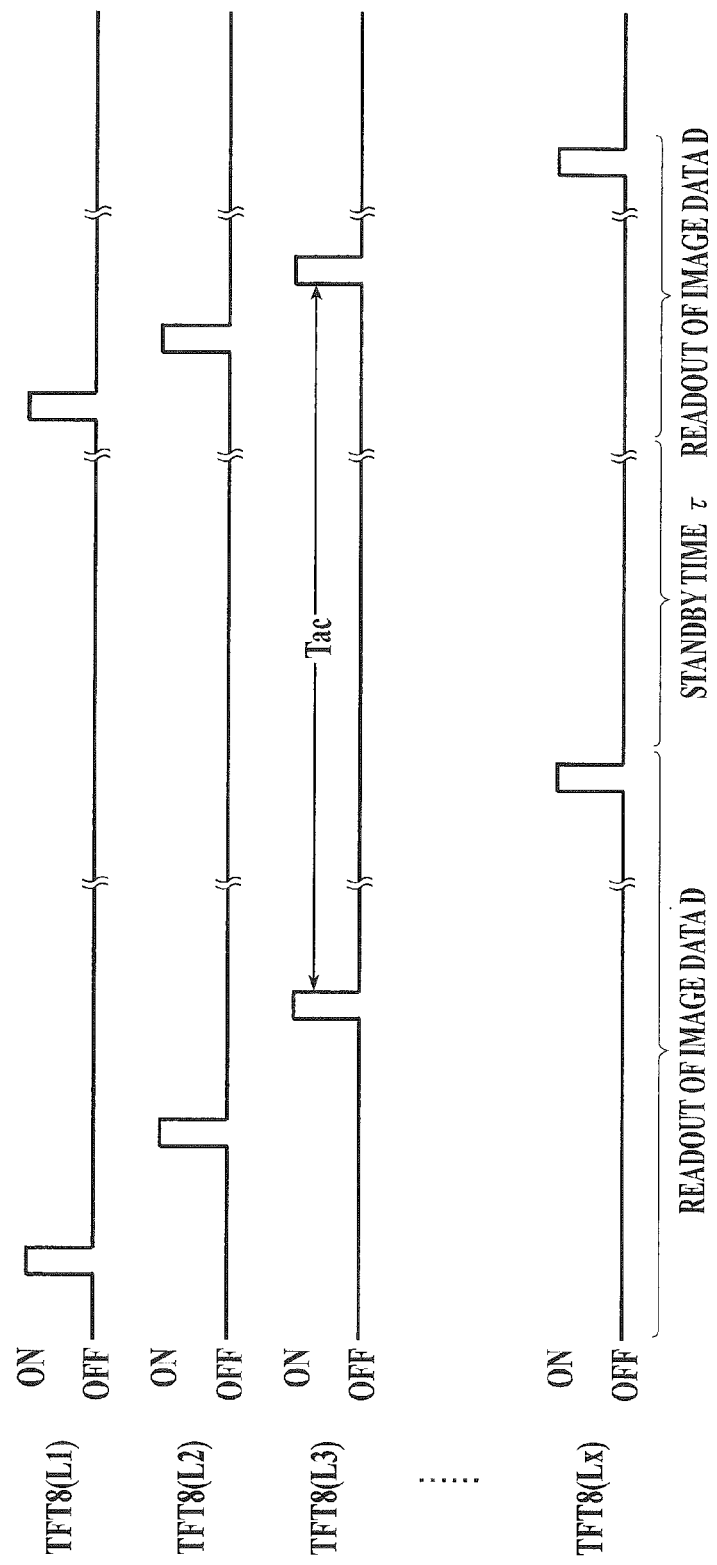
FIG. 10 shows that a change in readout time produces a difference in effective storage time among the scanning lines.

In the radiographic image capturing apparatus 1, the reading time $T_{RO}$ (readout time $T_{RO}$) of the image data D is controlled by, for example, adjusting the interval ΔT (see FIG. 6). In such a case, the effective storage time Tac differs among the lines L1-Lx of the scanning lines 5 as shown in FIG. 10. In other words, as shown in FIG. 10, if the reading time $T_{RO}$ of the latter image data D is set to be shorter than the former image data D reading time $T_{RO}$, the effective storage time Tac is longest at the first line L of the scanning line 5, and the effective storage time Tac decreases towards the last line Lx of the scanning line 5.

Since the scanning lines 5 have different offsets due to the dark electric charge superimposed on the image data D read during the latter readout, offset correction is required depending on the effective storage time Tac of each scanning line 5 during the image processing of the image data D read during the latter readout in the image processor 58. In such a case, the image data D generated by a series of capturing for moving images or other images is transmitted from the radiographic image capturing apparatus 1 to the image processor 58, together with the information on the standby time τ and on the adjusted readout time $T_{RO}$.

In the image processor 58, the effective storage time Tac is calculated for each scanning line 5 based on the information on the changed readout time $T_{RO}$ added to the image data D, then, the offset due to the dark electric charge superimposed on the image data D is determined from the calculated effective storage time Tac (or the transmitted effective storage time Tac when the information of the effective storage time Tac is transmitted from the radiographic image capturing apparatus 1), followed by correcting the image data D based on the above to generate a radiographic image. At the time, the image processor 58 may prepare reference offset data O for each radiation detector 7 in advance, and correct the reference offset data O with the calculated or transmitted effective storage time Tac as described above. Alternatively, before or after a series of capturing for moving images or other images, the radiographic image capturing apparatus 1 may acquire and then transmit the offset data O to the image processor 58 where the transmitted offset data is corrected based on the effective storage time Tac to be used for offset correction.

[Advantageous Effects]

As described above, the radiographic image capturing apparatus 1 in the radiographic image capturing system 50 of this embodiment changes the standby time τ and the readout time $T_{RO}$. This operation varies the effective storage time Tac and thus the offset due to the dark electric charge superimposed on the read image data D. The image processor 58 precisely calculates the offset due to such variable dark electric charge and subtracts it from the image data D to generate a radiographic image based on the above. Such a configuration allows the offset due to dark electric charge to be precisely calculated, subtracted and removed from the image data D regardless of a change in the standby time τ or the readout time $T_{RO}$ causing a change in the offset due to the dark electric charge superimposed on the image data D.

As described above, a reduction in the reading time (readout time) $T_{RO}$ of the image data D may be achieved by shortening the period during the application of the ON-state voltage to each line Ln of the scanning line 5 (see FIG. 6) and accordingly shortening the period from the application of a pulse voltage to the reference switch SHR to the application of a pulse voltage to the signal switch SHS. This shortens the period during which electric charge flows from each radiation detector 7 into the capacitor 18b of the amplifier circuit 18 in the readout circuit 17, which phenomenon is independent of the offset due to dark electric charge. Consequently, a pulse voltage may be applied to the signal switch SHS before sufficient electric charge flows thereinto, posing a risk of a reduction in size of the read image data D. No correction of image data D is required if a reduction in the image data D is negligible and an influence of such a reduction in the image data is barely visually observed in the generated radiographic image. The image data D is preferably corrected depending on such a reduction if the reduction of the data is visually observed.

[Second Embodiment]

In the first embodiment, the radiographic image capturing apparatus 1 can detect both the start and end of the irradiation with radiation from the radiation generator 55. Alternatively, the radiographic image capturing apparatus 1 may detect only one of the start or end of such irradiation with radiation.

To address such a situation, a radiographic image capturing apparatus 1 of the present invention will now be described that can detect only one of the start and end of such irradiation. Functional components common to the first and second embodiments are represented by the same reference numerals. In the second embodiment, for convenience of explanation, the radiographic image capturing apparatus 1 can detect only the end of the irradiation with radiation. The precise timing of the shortening of the readout time $T_{RO}$ is not always detectable; hence, the readout time $T_{RO}$ is set to a minimum value, i.e., the interval ΔT (see FIG. 6) is set to 0 in advance (this operation is also applied to the third embodiment).

The controller 22 in the radiographic image capturing apparatus 1 in this embodiment can detect not the start but the end of the irradiation of radiation from the radiation generator 55. Hence, the controller 22 in this embodiment determines whether the standby time τ (from the end of the current readout of the image data D to the start of the readout of the image data D in the next capturing) is adjusted, based on the period (period T2 which corresponds to the second period T2 in the first embodiment) from the end of the irradiation with radiation to the start of the readout of the image data D.

As described above, a reduction in the period T2 (see FIG. 8A, for example) may cause the start of the readout of the image data D during the irradiation with radiation. The standby time τ is increased to avoid such a phenomenon. In contrast, an excessively long period T2 results in a reduction in the first period T1 (which cannot be measured because the start of the irradiation with radiation is undetectable in this embodiment) described in the first embodiment, posing a risk of the start of the irradiation with radiation for the next capturing during the readout of the image data D. To solve such a problem, the controller 22 in the radiographic image capturing apparatus 1 in this embodiment adjusts the standby time τ according to Table 2.

TABLE 2

| | PERIOD T2 | |
|---|---|---|
| T2 ≤ FIRST REFERENCE VALUE γ (T2 ≤ γ) | FIRST REFERENCE VALUE γ < T2 < SECOND REFERENCE VALUE δ (γ < T2 < δ) | T2 ≥ SECOND REFERENCE VALUE δ (T2 ≥ δ) |
| EXTEND STANDBY TIME τ | UNCHANGED | SHORTEN STANDBY TIME τ |

In other words, if the period T2 (from the end of the irradiation with radiation in the current capturing to the start of the readout of the image data D in the current capturing) is less than or equal to a first reference value γ, the controller 22 in the radiographic image capturing apparatus 1 increases the standby time τ to extend the period T2. Such control prevents the start of the readout of the image data D during the irradiation with radiation in the next capturing. In contrast, if the period T2 is greater than or equal to a second reference value δ, the irradiation with radiation for the next capturing may start during the readout of the image data D as described above. The controller 22 thus reduces the standby time τ to shorten the period T2. If the period T2 is greater than the first reference value γ and less than the second reference value δ, an overlap is prevented between the timing of the irradiation with radiation and the timing of the readout of the image data D. The controller 22 thus does not adjust the standby time τ and leaves it unchanged.

Such a configuration allows for the precise determination on the adjustment of the standby time τ even if the radiographic image capturing apparatus 1 can detect only the end of irradiation with radiation. This accurately prevents an overlap between the timing of the irradiation with radiation and the timing of the readout of the image data D, e.g., it is possible to prevent the start of the readout of the image data D during irradiation with radiation, and the start of irradiation with radiation during the readout of the image data D occurring in the next capturing.

This embodiment and the third embodiment have the basic configuration of the first embodiment. The radiographic image capturing apparatus 1 transmits image data D together with information on the standby time τ, and the image processor 58 carries out offset correction for the image data D based on the information on the standby time τ to generate a radiographic image. Thus, the radiographic image can be accurately generated independently of a change in the standby time τ.

[Third Embodiment]

In the third embodiment, the radiographic image capturing apparatus 1 can detect only the start of the irradiation with radiation.

In this embodiment, the controller 22 in the radiographic image capturing apparatus 1 cannot detect the timing of the end of the irradiation of radiation from the radiation generator 55, and thus determines whether the standby time τ (from the end of the current readout of the image data D to the start of the readout of the image data D in the next capturing) is adjusted, based on the period (period T1 which corresponds to the first period T1 in the first embodiment) from the end of the readout of image data D to the start of irradiation with radiation.

As described above, a reduction in the period T1 (see FIG. 8B, for example) may cause the start of irradiation with radiation during the readout of the image data D. The standby time τ is reduced to avoid such a phenomenon. This increases the period T1 for the next capturing. In contrast, an excessively short standby time τ results in a reduction in the second period T2 (which cannot be measured because the end of irradiation with radiation is undetectable in this embodiment) described in the first embodiment, posing a risk of the start of the readout of the image data D during irradiation with radiation. To solve such a problem, the controller 22 in the radiographic image capturing apparatus 1 in this embodiment adjusts the standby time τ according to Table 3.

TABLE 3

| | PERIOD T1 | |
|---|---|---|
| T1 ≤ REFERENCE VALUE ε (T1 ≤ ε) | THIRD REFERENCE VALUE ε < T1 < FOURTH REFERENCE VALUE ζ (ε < T1 < ζ) | T1 ≥ FOURTH REFERENCE VALUE ζ (T1 ≥ ζ) |
| SHORTEN STANDBY TIME τ | UNCHANGED | EXTEND STANDBY TIME τ |

In other words, if the period T1 (from the end of the readout of the image data D in the current capturing to the start of the irradiation with radiation in the next capturing) is less than or equal to a third reference value ε, the controller 22 in the radiographic image capturing apparatus 1 reduces the standby time τ to extend the period T1. Such control prevents the start of irradiation with radiation during the readout of the image data D. If the period T1 is greater than or equal to a fourth reference value ζ, the second period T2 (undetectable in this embodiment) in FIG. 8B is shortened and the readout of the image data D may start during the irradiation with radiation in the next capturing as described above. To avoid such a risk, the controller 22 increases the standby time τ to shorten the period T1 and extend the second period T2. If the period T1 is greater than the third reference value ε and less than the fourth reference value ζ, an overlap is prevented between the timing of the irradiation with radiation and the timing of the readout of the image data D. The controller 22 thus does not adjust the standby time τ and leaves it unchanged.

Such a configuration allows for the precise determination on the adjustment of the standby time τ even if the radiographic image capturing apparatus 1 can detect only the start of irradiation with radiation. This accurately prevents an overlap between the timing of the irradiation with radiation and the timing of the readout of the image data D, e.g., the start of the readout of the image data D during irradiation with radiation, and the start of irradiation with radiation during the readout of the image data D occurring in the next capturing.

[Conditions for Changing Standby Time τ and Readout Time $T_{RO}$]

Conditions will now be described for changing the standby time τ and the readout time $T_{RO}$ (see FIG. 7, for example). In the above embodiments, the standby time τ and other time range are changed so as to minimize the difference in length between the adjusted first period T1 and second period T2 provided that an overlap is prevented between the timing of irradiation with radiation and the timing of the readout of the image data D. To achieve this, the first embodiment changes the standby time τ such that the first period T1 and the second period T2 have the same length. In such a case, for each capturing among the series of capturing for moving images or quasi-moving images (for each of the scanning lines 5 as shown in FIG. 10 when the readout time $T_{RO}$ is changed), the image processor 58 calculates the effective storage time Tac from the standby time τ and other time range and corrects the offset data O according to the effective storage time Tac to use it for offset correction as described above, allowing for accurate image processing.

To display radiographic images generated by such capturing for moving images or quasi-moving images, for example, on the display 58a (see FIG. 4) of the image processor 58, particularly in real time, the subtraction of the offset data O from the image data D obtained in each capturing may be skipped to sequentially generate radiographic images based on a difference between the pieces of image data D and sequentially display them.

For instance, the offset data O is preliminarily read without irradiation of the radiographic image capturing apparatus 1 with radiation and transmitted from the radiographic image capturing apparatus 1 to the image processor 58 before a series of capturing for moving images or other images. An initial capturing for moving images or other images is then conducted and the image data D is read from each radiation detector 7. Upon reception of the image data D (resulting from the initial capturing) from the radiographic image capturing apparatus 1, the image processor 58 generates a radiographic image based on the actual image data D* (see Expression (4)) obtained by subtracting the offset data O from the image data D. Upon reception of the image data D read in the second or subsequent capturing, the image processor 58 calculates a difference ΔD (between the image data D read in the current capturing and the image data D (image data $D_{old}$) read in the preceding capturing) for each radiation detector 7 according to Expression (5).

$$\Delta D = D - D_{old} \quad (5)$$

The difference ΔD is then added to the actual image data $D^*_{old}$ (calculated from the image data $D_{old}$ read in the preceding capturing) according to Expression (6) to calculate the actual image data D* from the image data D read in the current capturing. A radiographic image is generated based on the resulting actual image data D* in some cases.

$$D^* = D^*_{old} + \Delta D \quad (6)$$

In this case, Expression (6) can be modified to:

$$D^* = D^*_{old} + \Delta D \quad \text{(Expression (4))}$$
$$= (D_{old} - O) + \Delta D$$
$$= (D_{old} - O) + (D - D_{old}) \quad \text{(Expression (5))}$$
$$= D - O \quad (7)$$

Since Expression (7) holds, as shown by Expression (4), the difference ΔD (between the image data read in the current capturing and the image data $D_{old}$ read in the preceding capturing) can be calculated in the current capturing without subtracting the offset data O from the image data D each time, so that the actual image data D* can be readily obtained by only adding the difference ΔD to the actual image data $D^*_{old}$ determined in the preceding capturing. This allows a radiographic image captured in each capturing for moving images or other images to be displayed on the display 58a or other devices in real time.

In a strict sense, Expression (7) holds only if the offset data O (based on the image data D read in a series of capturing for moving images or other images) is fixed. Accordingly, such a process is theoretically inapplicable to the case where a change in the standby time τ or other time range leads to a change in the effective storage time Tac and thus a change in the offset data O for the image data D as in the above embodiments. Since a slight change in the offset data O however barely causes a variation between, for example, the brightnesses of radiographic images generated by different capturing, a viewer (e.g., a doctor) does not recognize such a variation in a sequence of radiographic images.

For instance, the standby time τ may be changed at appropriate (not too long) fixed time spans, unlike in the first embodiment. In particular, the standby time τ or other time range is changed not at once but gradually, i.e., at predetermined time spans and in each capturing in order to minimize a difference in length between the first period T1 and the second period T2 according to Tables 1 to 3.

Such a configuration allows the viewer to be insensitive to a sudden change in brightness between the preceding radiographic image and the radiographic image that is generated from the actual image data D* after the standby time τ is changed. Thus, the viewer can see a sequence of radiographic images (moving images or quasi-moving images) without recognizing a variation therebetween. The doctor carries out a diagnosis of a patient's body or a lesion area with reference to such moving images or quasi-moving images in some cases. The above configuration allows the doctor to see such images smoothly without misdiagnosis confused by a sudden change in brightness between such images.

The conditions for extending or shortening the standby time τ according to Tables 1 to 3 have been described above. In addition, conditions may be established for determining whether to change the standby time τ or other time range in the state "unchanged" in each table. Specifically, as is evident from Expressions (5) and (6), the standby time τ or other time range is preferably unchanged if the actual image data D* in the current capturing (based on the difference ΔD between pieces of image data D and the actual image data $D^*_{old}$ in the preceding capturing) can be calculated irrespective of a change in the standby time τ or other time range (if T1 >β and T2 >β hold in Table 1).

If the offset data O for the image data D read in each capturing in the sequence of capturing is corrected depending on the effective storage time Tac (based on the standby time τ or other time range) as in the above embodiments, the standby time τ may be set to a predetermined value in the state "unchanged". In such a configuration, once the offset data O for the image data D read in the state "unchanged" is determined by image processing depending on the effective storage time Tac (based on the standby time τ or any other time range at a predetermined value), the offset data O can be used any number of times without recalculation. This facilitates the calculation of the actual image data D* according to Expression (4) and thus facilitates the generation of radiographic images from the image data D produced by a series of radiographic capturing for moving images or quasi-moving images.

[Configuration to Shorten Readout Time $T_{RO}$]

If the cycle $T_X$ (during the irradiation with radiation from the radiation generator 55) and if the irradiation time $T_{IR}$ are unfixed, it is preferred to minimize the image data D reading time $T_{RO}$ (the readout time $T_{RO}$) and maximize the first period T1 (from the end of the readout of the image data D to the start of the irradiation with radiation in the next capturing) and the second period T2 (from the end of the irradiation with radiation to the start of the readout of the image data D) (see FIGS. 7 to 9) in order to prevent an overlap between the timing of irradiation with radiation and the timing of the readout of the image data D, as described above.

In order to read the image data D, the above embodiments preliminarily set the interval ΔT (see FIG. 6) ranging from the end of the conversion in the A/D converter 20 for the readout of the image data D from the radiation detectors 7 connected to the line Ln of the scanning line 5 to the start of the readout of the image data D from the radiation detectors 7 connected to the next line Ln+1 of the scanning line 5, and shorten the interval ΔT to reduce the readout time $T_{RO}$. The embodiments also shorten the application period of the ON-state voltage to each line Ln of the scanning line 5 to shorten the period from the application of a pulse voltage to the reference switch SHR to the application of a pulse voltage to the signal switch SHS, thereby reducing the readout time $T_{RO}$.

A process will now be described for further reducing the readout time $T_{RO}$ by moving up the timing of the application of a pulse voltage to the signal switch SHS. In the following description, a voltage is sampled and held in the signal capacitor $C_S$ and the reference capacitor $C_R$ (see FIG. 5) at the falling of a pulse voltage applied to the signal switch SHS or the reference switch SHR. In addition, a voltage is sampled and held in the signal capacitor $C_S$ and other elements at the rising of the pulse voltage.

Figure 11:
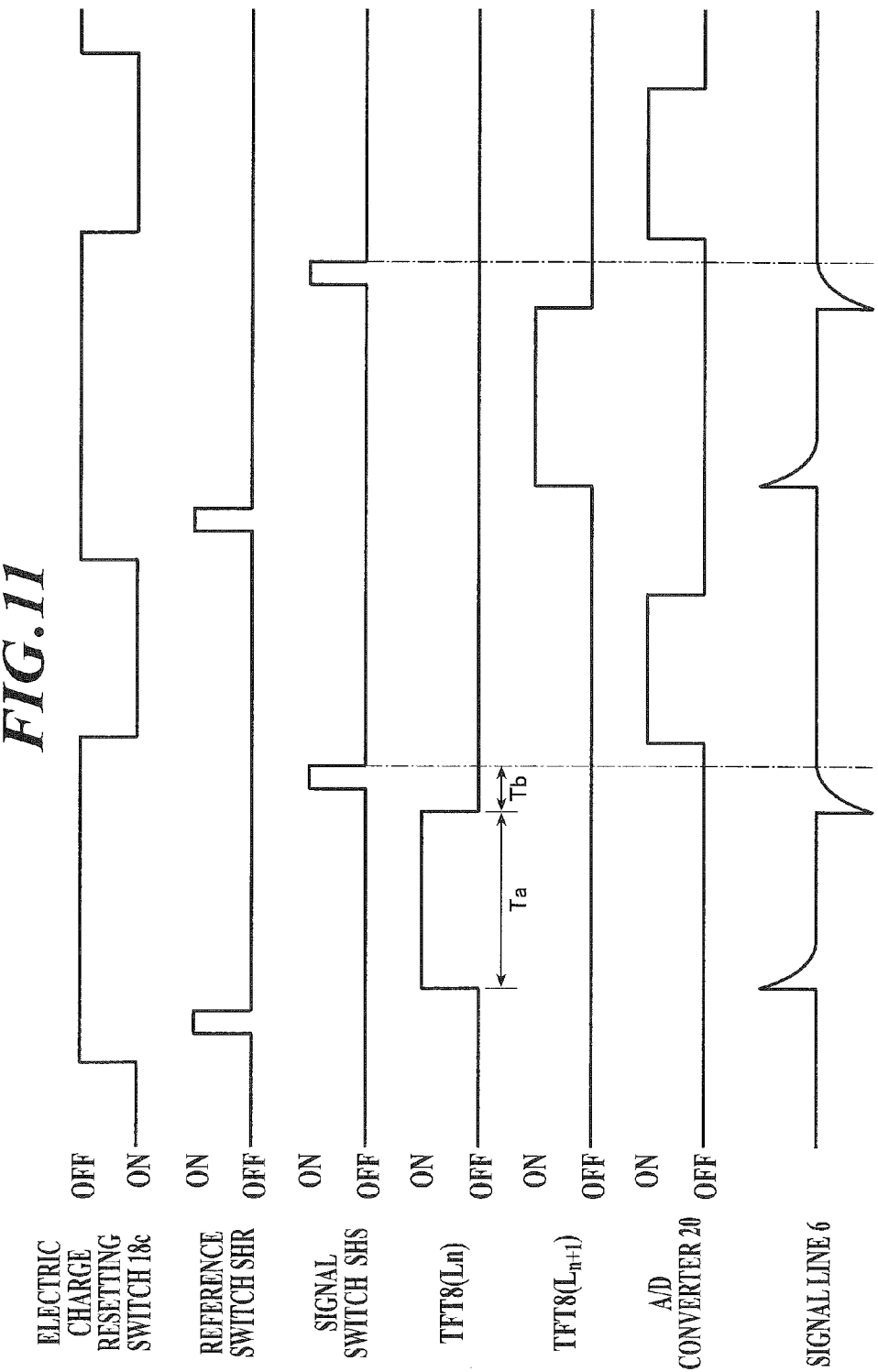
FIG. 11 shows, for example, that the application of the ON-state voltage or OFF-state voltage to scanning lines causes instantaneous rise or drop in the voltages of the signal lines.

In this embodiment, as shown in FIGS. 2 and 3, the TFT 8, an insulating layer, and other elements (not shown) are present between the scanning line 5 and the signal line 6. This portion is a form of capacitor, and this configuration forms a parasitic capacitor c. As shown in FIG. 11, at the readout of the image data D, the application of the ON-state voltage, for example, to the line Ln of the scanning line 5 causes an instantaneous rise in the voltage of the signal line 6 through the parasitic capacitor c. In response to such a phenomenon, current (through current) flows through the signal line 6 and other lines to reduce the voltage of the signal line 6 to an original value. As the voltage applied to the line Ln of the scanning line 5 is then switched from the ON-state voltage to the OFF-state voltage, the voltage of the signal line 6 instantaneously drops through the parasitic capacitor c. This also causes current to flow through the signal line 6 and other lines to increase the voltage signal line 6 to an original value. This phenomenon sequentially occurs at the application of the ON-state voltage to each of the lines L1-Lx of the scanning lines 5.

During such a phenomenon, if the pulse of the voltage of the signal switch SHS falls before the voltage of the signal line 6 dropped by the switching of the scanning line 5 from the ON-state voltage to the OFF-state voltage rises to an original value, the voltage at the output of the operational amplifier 18a of the amplifier circuit 18 is held in the signal capacitor $C_S$ although the voltage of the signal line 6 is still not at the original value. This may result in an abnormal value of the image data D which represents a difference between the voltage held in the signal capacitor $C_S$ and the voltage held in the reference capacitor $C_R$. To prevent such a risk, as shown in FIG. 11, the pulse voltage of the signal switch SHS in the normal mode is designed to fall after the voltage of the scanning line 5 is switched from the ON-state voltage to the OFF-state voltage and after the voltage of the signal line 6 drops and then rises to an original value.

In other words, the pulse voltage of the signal switch SHS in a traditional configuration cannot be designed to fall immediately after the voltage of the scanning line 5 is switched from the ON-state voltage to the OFF-state voltage for the readout of the image data D. In particular, as shown in FIG. 11, the pulse voltage of the signal switch SHS in a traditional configuration is designed to fall after the scanning line 5 is held at the ON-state voltage for a time Ta and then at the OFF-state voltage after a lapse time Tb. Thus, for accurate readout of the image data D from each radiation detector 7, predetermined time Ta during which the scanning line 5 is held at the ON-state voltage is necessary, thus, the pulse voltage of the signal switch SHS in a traditional configuration is designed to fall at least after the predetermined time Ta and the subsequent time Tb. The lapse time Tb is taken for every several thousands to several tens of thousands of scanning lines 5, which is one of the reasons of excessively long reading time $T_{RO}$ (readout time $T_{RO}$) for image data D.

Figure 12:
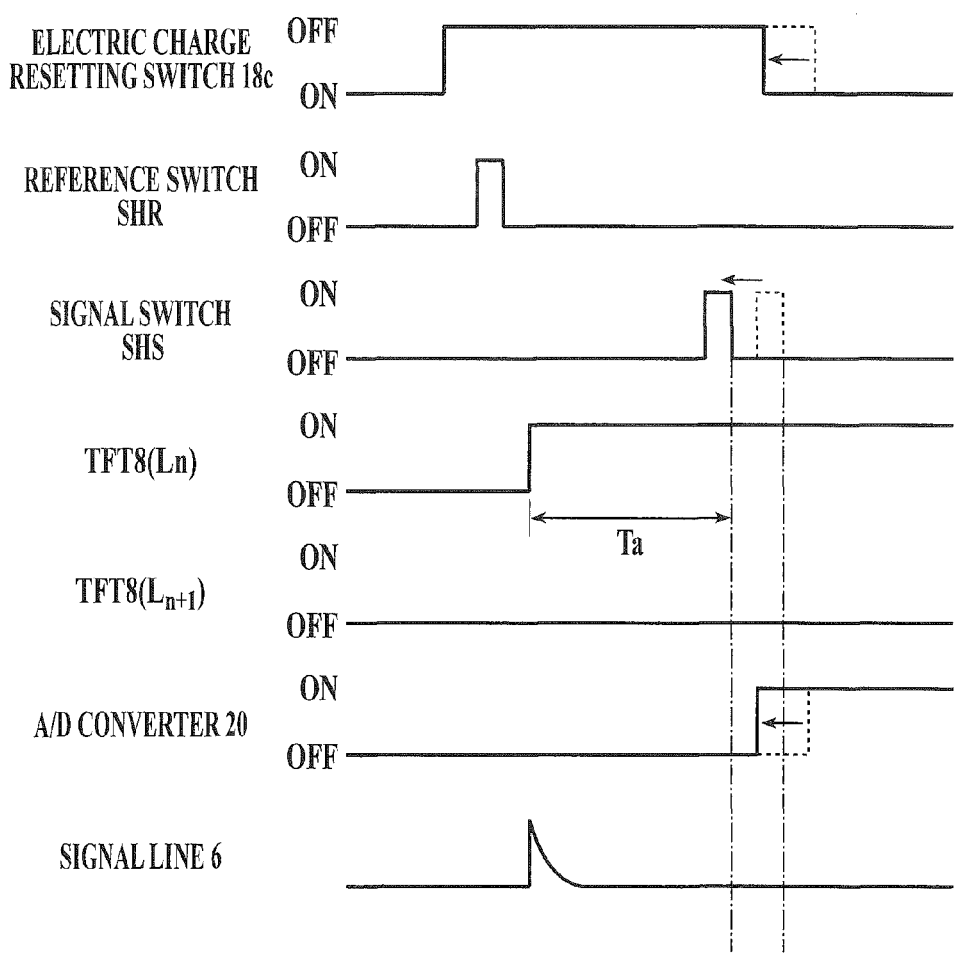
FIG. 12 is a timing chart when the scanning lines are still held at the ON-state voltage after a time Ta from the application of the ON-state voltage to the scanning lines and the pulse voltage applied to signal switches are dropped after the time Ta.

The lapse time Tb can be eliminated (or nulled) in a way, for example, shown in FIG. 12, where the scanning line 5 is still held at the ON-state voltage after the time Ta from the application of the ON-state voltage to the scanning line 5 while the pulse voltage of the signal switch SHS is dropped after the time Ta from the application of the ON-state voltage to the scanning line 5.

Such a configuration, as shown in FIG. 12, can advance the timing of the application of the pulse voltage to the signal switch SHS (precisely, the timing to drop the pulse voltage applied to the signal switch SHS) by the lapse time Tb, and thus advance the start of the conversion into digital image data D in the A/D converter 20 and other processes. This eliminates the need for the lapse time Tb for the readout of each line L of the scanning line 5 and reduces the readout time $T_{RO}$ required for the readout of the image data D for several thousands to several tens of thousands of scanning lines 5.

As shown in FIG. 12, the application of the ON-state voltage should not be continued to the scanning line 5 and is inevitably switched to the OFF-state voltage at a given timing. The timing will be exemplified below that switches the voltage of the scanning line 5 from the ON-state voltage to the OFF-state voltage in the above configuration.

EXAMPLE 1

Figure 13:
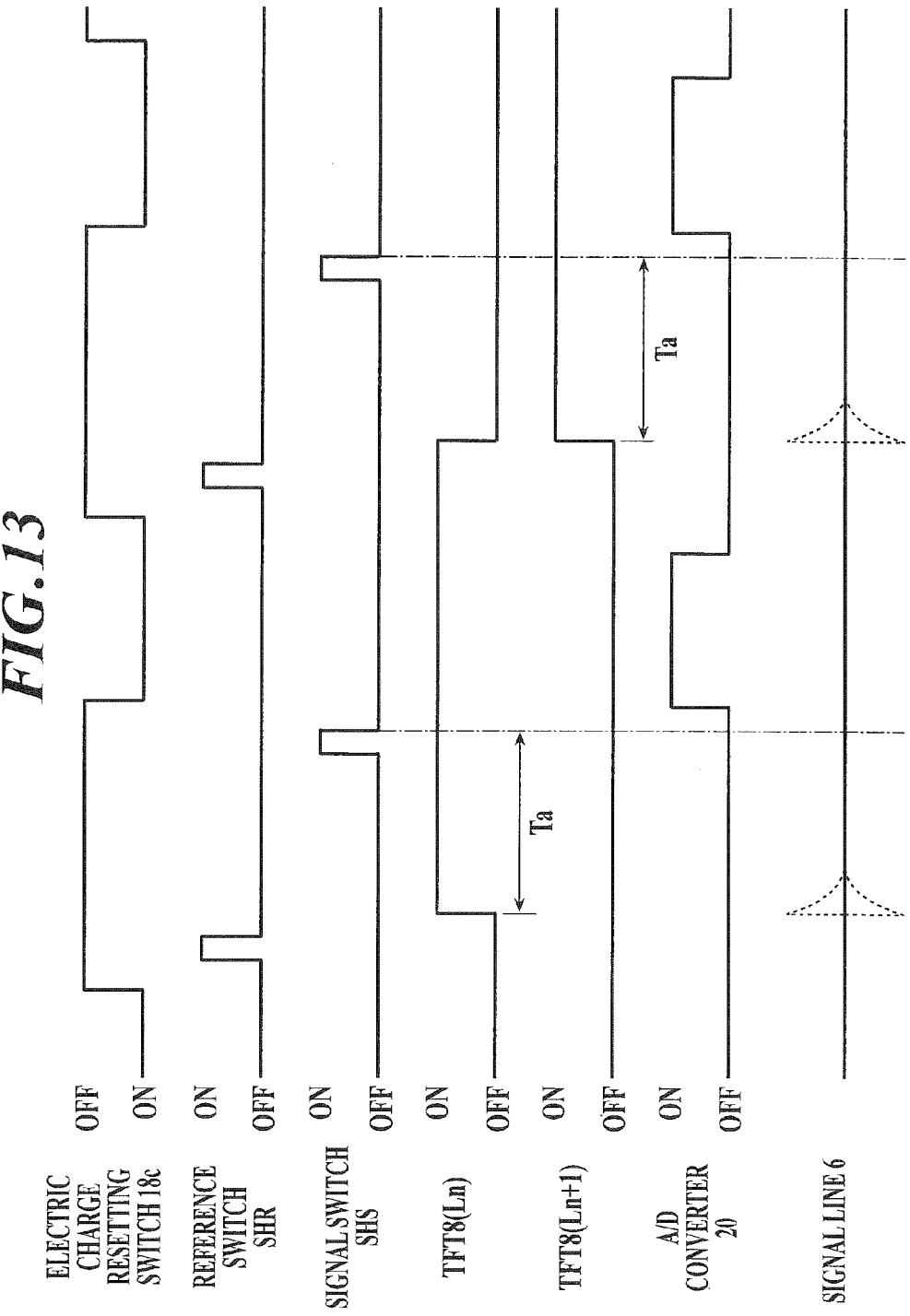
FIG. 13 is a timing chart when the voltage applied on a scanning line is switched to the OFF-state voltage at the same time as applying the ON-state voltage to the next scanning line.

In order to read the image data D by sequentially applying the ON-state voltage from the gate driver 15b of the scanning driving unit 15 (see FIG. 3, for example) to the lines L1 to Lx of the scanning lines 5, the controller 22 in the radiographic image capturing apparatus 1 may control the scanning driving unit 15 such that, as shown in FIG. 13, for example, the timing of the switching of the scanning line 5 (e.g., the line Ln) to the OFF-state voltage by the gate driver 15b is in synchronism with the timing of the application of the ON-state voltage to the next scanning line 5 (e.g., the line Ln+1).

Such a configuration provides a synchronism between a rise in the voltage of the signal line 6 due to the switching of the line Ln of the scanning line 5 to the OFF-state voltage and a drop in the voltage of the signal line 6 due to the application of the ON-state voltage to the line Ln+1 of the scanning line 5, as shown in FIG. 13. Thus, the rise and drop in the voltage of the signal line 6 are mutually offset. Alternatively, the rise and drop in the voltage of the signal line 6 are reduced to a negligible level. Such offset or reduction of the rise and drop in the voltage of the signal line 6 is advantageous in that it prevents noise due to the rise and drop in the voltage of the signal line 6 or reduces such noise to a negligible level and in that it prevents through current flowing through the signal line 6 or reduces such through current to a negligible level.

EXAMPLE 2

Figure 14:
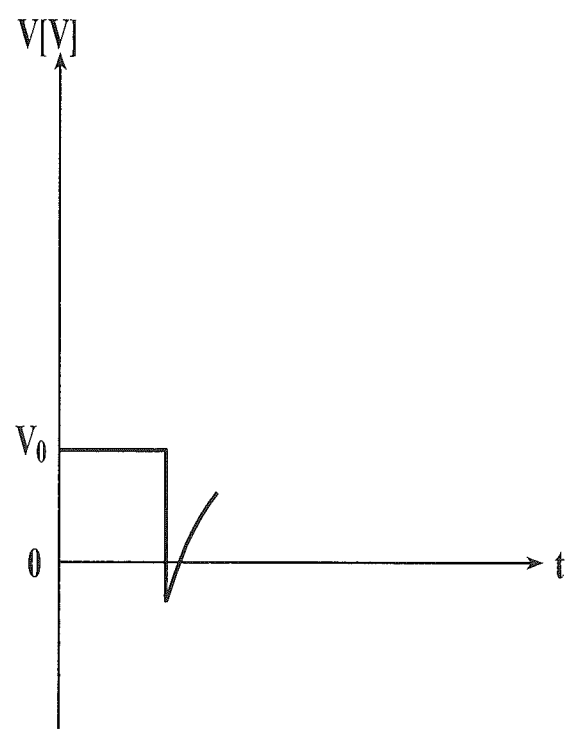
FIG. 14 is a graph showing that the voltage at the output of an operational amplifier falls to a value equal to or below the lower limit voltage (0 V) upon a rise in the voltage of a signal line.

Another approach is available for setting the timing of the switching of the scanning line 5 from the ON-state voltage to the OFF-state voltage. With reference to FIG. 5, the operational amplifier 18a of the amplifier circuit 18 in the readout circuit 17 in the above embodiments has an inverting input terminal connected to the signal line 6 and a non-inverting input terminal at the input of the operational amplifier 18a is applied with the reference potential $V_0$. Hence, an instantaneous rise in the voltage of the signal line 6 due to the application of the ON-state voltage from the gate driver 15b to the scanning line 5 (see FIG. 12) may cause a voltage V at the output of the operational amplifier 18a of the amplifier circuit 18 to instantaneously drop from the reference potential $V_0$ to below or equal to the lower limit voltage (see FIG. 14). In this embodiment and FIG. 14, the lower limit voltage is 0 V, although it may be any other value.

Since the voltage V (at the output of the operational amplifier 18a of the amplifier circuit 18) below or equal to the lower limit voltage may be non-linear, the voltage V should be maintained not so as to fall below the lower limit voltage.

Figure 15:
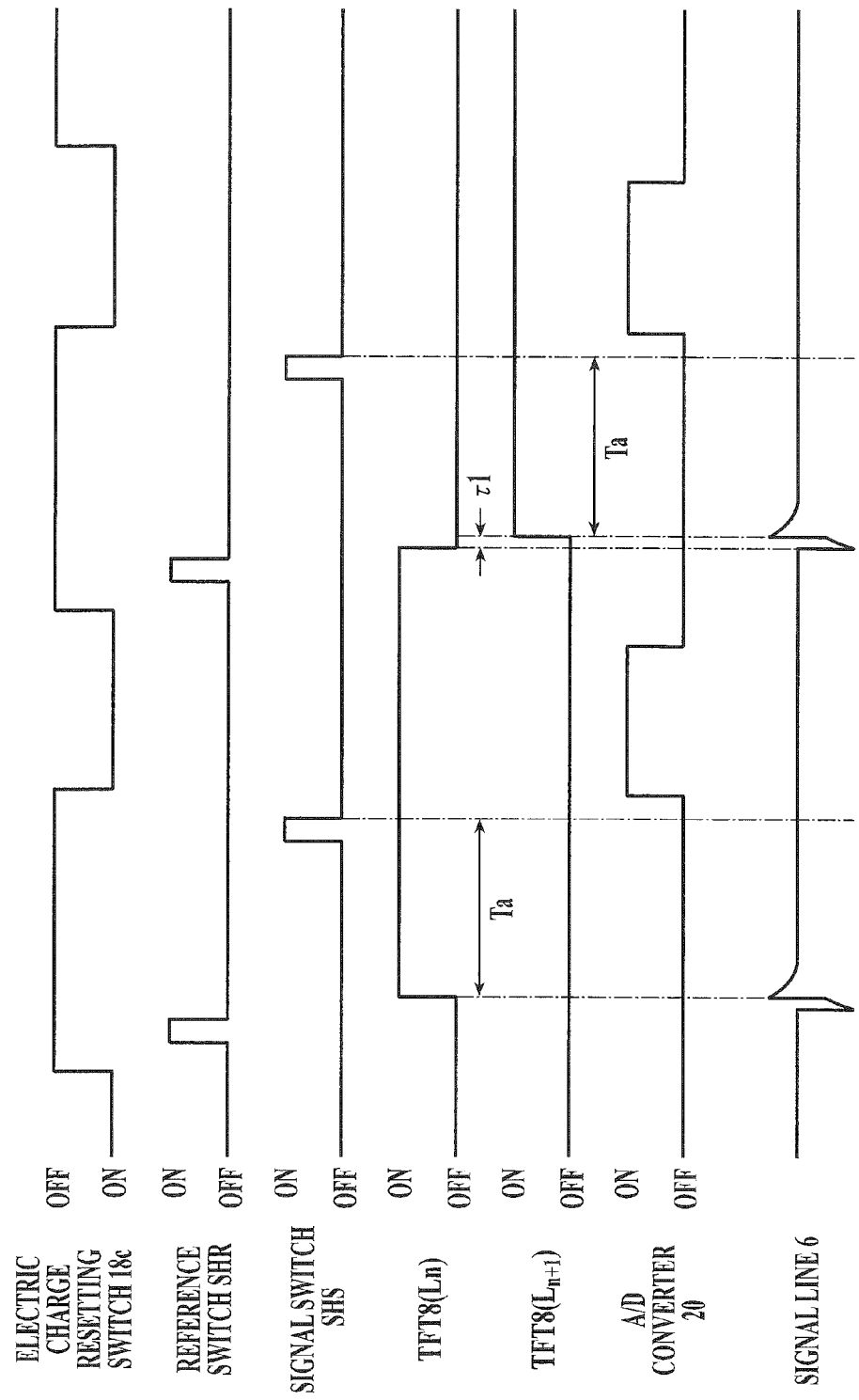
FIG. 15 is a timing chart when the voltage applied on a scanning line is controlled to be switched to the OFF-state voltage so as to be close to applying the ON-state voltage to the next scanning line.

In this case, the drop of the voltage V at the output of the operational amplifier 18a of the amplifier circuit 18 below the lower limit voltage can be avoided by taking advantage of a phenomenon in which the switching of the voltage of the scanning line 5 to the OFF-state voltage by the gate driver 15b causes an instantaneous drop in the voltage of the signal line 6 (see FIG. 11). In particular, as shown in FIG. 15, for example, the timing of the switching of the voltage of the scanning line 5 (e.g., the line Ln) to the OFF-state voltage by the gate driver 15b of the scanning driving unit 15 is made close to the timing of the application of the ON-state voltage to the next scanning line 5 (e.g., the line Ln+1). More specifically, the interval $\tau 1$ (from the switching of the voltage of the scanning line 5 (e.g., the line Ln) to the OFF-state voltage by the gate driver 15b to the application of the ON-state voltage to the next scanning line 5 (e.g., the line Ln+1)) is reduced to a small level.

Consequently, as shown in FIG. 15, the ON-state voltage is applied to the line Ln+1 of the scanning line 5 immediately after the voltage of the signal line 6 instantaneously drops in synchronism with the switching of the voltage of the line Ln of the scanning line 5 to the OFF-state voltage. At the start of the application of the ON-state voltage to the line Ln+1 of the scanning line 5, the voltage of the signal line 6 is significantly below the reference potential $V_0$. Hence, an instantaneous rise in the voltage of the signal line 6 due to the application of the ON-state voltage to the line Ln+1 of the scanning line 5 leads to a voltage of the signal line 6 slightly exceeding the reference potential $V_0$.

Figure 16:
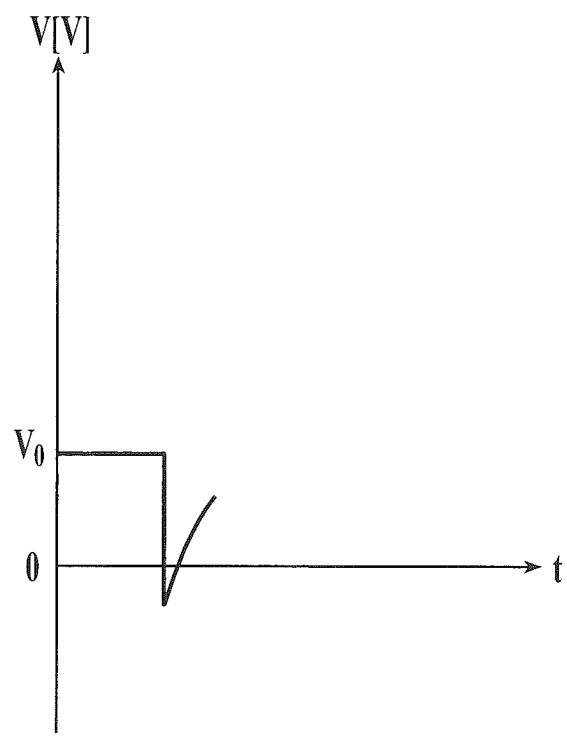
FIG. 16 is a graph showing that the control shown in FIG. 15 prevents the voltage at the output of the operational amplifier from falling to a value equal to or below the lower limit voltage (0 V).

Since such a variable voltage of the signal line 6 is supplied to the inverting input terminal of the operational amplifier 18a of the amplifier circuit 18 in the readout circuit 17, as shown in FIG. 16, the voltage V at the output of the operational amplifier 18a significantly rises upon the switching of the voltage of the line Ln of the scanning line 5 to the OFF-state voltage, drops upon the application of the ON-state voltage to the line Ln+1 of the scanning line 5, then slightly falls below the reference potential $V_0$, and soon returns to the reference potential $V_0$. Such a configuration accurately prevents the voltage V at the output of the operational amplifier 18a of the amplifier circuit 18 in the readout circuit 17 from falling below of equal to the lower limit voltage (e.g., 0 V) regardless of variations in the voltage of the signal line 6 due to the application of the ON-state voltage and the OFF-state voltage to the scanning line 5.

In other words, the interval $\tau 1$ (see FIG. 15) is set to a value that prevents the voltage V at the output of the operational amplifier 18a of the amplifier circuit 18 in the readout circuit 17 from falling below or equal to the lower limit voltage (e.g., 0 V) regardless of variations in the voltage of the signal line 6 due to the application of the ON-state voltage and the OFF-state voltage to the scanning line 5. Such a configuration is advantageous in that it surely prevents the voltage V at the output of the operational amplifier 18a from falling below or equal to the lower limit voltage and maintains the accurate linearity of the voltage V at the output of the operational amplifier 18a.

In Example 2, as in Example 1 (see FIG. 13), the timing of switching the voltage of the scanning line 5 (e.g., the line Ln) to the OFF-state voltage by the gate driver 15b may be brought in synchronism with the timing of the application of the ON-state voltage to the next scanning line 5 (e.g., the line Ln+1). In other words, the interval $\tau 1$ may be set to 0 second.

It should be understood that the present invention should not be limited to the above embodiments and the configurations to shorten the readout time $T_{RO}$, and appropriate modifications can be made without departing from the spirit of the invention.

The present application is based on Japanese Patent Application No. 2013-038073 filed on Feb. 28, 2013 to the Japanese Patent Office, which shall be a basis for correcting mistranslations.

What is claimed is:
1. A radiographic image capturing apparatus comprising:
a plurality of radiation detectors which are two-dimensionally arrayed;
a detecting unit configured to detect start and end of radiation irradiation to the plurality of radiation detectors;
a readout circuit configured to read the image data from the plurality of radiation detectors; and
a controller configured to control the readout circuit to repeat an operation in which a readout of the image data of next image capturing starts after a standby time has elapsed from an end of readout of the image data of previous image capturing so that a series of a plurality of radiographic image are captured;
wherein the controller is structured to control the readout circuit to change a length of the standby time based on a first period and a second period so as to avoid an overlap between the timing of the readout of image data from the plurality of radiation detectors and the timing of the radiation irradiation to the plurality or radiation detectors;
wherein the first period is a period of time from an end of readout of the image data of a previous radiographic image capturing to a detection of a start of irradiation with radiation in the current capturing;
wherein the second period is a period of time from a detection of an end of irradiation of radiation of the current radiographic image capturing to a start of readout of the image data of the current radiographic image capturing; and wherein the controller changes the standby time so that a time length of the first period becomes closer to a time length of the second period when the standby time is changed.

2. The radiographic image capturing apparatus of claim 1, wherein the standby time is changed at a fixed time span.

3. The radiographic image capturing apparatus of claim 1, wherein the controller determines whether the time required for readout of the image data is changed, in addition to whether the standby time is changed.

4. The radiographic image capturing apparatus of claim 1, wherein during readout of the image data conducted by sequentially applying the ON-state voltage supplied from the scanning driving unit to each scanning line, the controller controls the scanning driving unit such that timing of switching of the scanning line to the OFF-state voltage by the scanning driving unit is in synchronization with timing of application of the ON-state voltage to a next scanning line on which the ON-state voltage is to be applied.

5. The radiographic image capturing apparatus of claim 1, wherein during readout of the image data conducted by sequentially applying the ON-state voltage supplied from the scanning driving unit to each scanning line, the controller sets a time interval from switching of the scanning line to the OFF-state voltage by the scanning driving unit to application of the ON-state voltage to a next scanning line on which the ON-state voltage is to be applied such that a voltage at the output of the operational amplifier in the readout circuit does not fall below or equal to a lower limit voltage.

6. A radiographic image capturing system comprising:
the radiographic image capturing apparatus of claim 1,
a radiation generator which emits radiation toward the radiographic image capturing apparatus; and
an image processor which generates a radiographic image based on the image data transmitted from the radiographic image capturing apparatus, wherein
the controller in the radiographic image capturing apparatus transmits the image data acquired by a series of radiographic image capturing to the image processor together with information on the standby time, and
the image processor performs offset correction on the image data based on the information on the standby time to generate a radiographic image.

7. A radiographic image capturing system comprising:
the radiographic image capturing apparatus of claim 3;
a radiation generator which emits radiation toward the radiographic image capturing apparatus; and
an image processor which generates a radiographic image based on the image data transmitted from the radiographic image capturing apparatus, wherein during transmission of the image data acquired by a series of radiographic image capturing, the controller in the radiographic image capturing apparatus transmits the image data read at a changed readout time for readout of the image data to the image processor together with information on the changed readout time, and
the image processor corrects the image data with the information on the changed readout time for readout of the image data based on the information to generate a radiographic image.

8. A radiographic image capturing apparatus comprising;
a plurality of radiation detectors which are two-dimensionally arrayed;
a detecting unit configured to detect start and end of radiation irradiation to the plurality of radiation detectors;
a readout circuit configured to read the image data from the plurality of radiation detectors; and
a controller configured to control the read out circuit to repeat an operation in which a readout of the image data of text image capturing starts after a standby time has elapsed from an end of readout of the image data of previous image capturing so that a series of a plurality of radiographic image are captured;
wherein the controller is structured to control the readout circuit to change a length of the standby time based on a first period and a second period so as to avoid an overlap between the timing of the read out of image data from the plurality of radiation detectors and the timing of the radiation irradiation to the plurality or radiation detectors;
wherein the first period is a period of time from an end of readout of the image data of a previous radiographic image capturing to a detection of a start of irradiation with radiation in the current capturing;
wherein the second period is a period of time from a detection of an end of irradiation of radiation of the current radiographic image capturing to a start of readout of the image data of the current radiographic image capturing;
wherein the controller determines whether the time required for readout of the image data is changed, in addition to whether the standby time is changed; and
wherein the controller changes the time required for readout of the image data so that a time length of the first period becomes closer to a time length of the second period when the time required for readout of the image data is changed.

* * * * *